(12) United States Patent
Li et al.

(10) Patent No.: US 9,556,368 B2
(45) Date of Patent: Jan. 31, 2017

(54) VEGETABLE OIL-BASED PRESSURE-SENSITIVE ADHESIVES

(71) Applicant: State of Oregon acting by and through the State Board of Higher Education on behalf of Oregon State University, Corvallis, OR (US)

(72) Inventors: Kaichang Li, Corvallis, OR (US); Anlong Li, Corvallis, OR (US)

(73) Assignee: Oregon State University, Corvallis, OR (US)

(*) Notice: Subject to any disclaimer, the term of this patent is extended or adjusted under 35 U.S.C. 154(b) by 117 days.

(21) Appl. No.: 14/363,781

(22) PCT Filed: Dec. 5, 2012

(86) PCT No.: PCT/US2012/067976
§ 371 (c)(1),
(2) Date: Jun. 6, 2014

(87) PCT Pub. No.: WO2013/086014
PCT Pub. Date: Jun. 13, 2013

(65) Prior Publication Data
US 2014/0342153 A1    Nov. 20, 2014

Related U.S. Application Data

(60) Provisional application No. 61/568,099, filed on Dec. 7, 2011.

(51) Int. Cl.
*C09J 163/00* (2006.01)
*B32B 37/26* (2006.01)
(Continued)

(52) U.S. Cl.
CPC .............. *C09J 163/00* (2013.01); *B32B 37/26* (2013.01); *C08G 59/42* (2013.01); *C08G 63/42* (2013.01);
(Continued)

(58) Field of Classification Search
None
See application file for complete search history.

(56) References Cited

U.S. PATENT DOCUMENTS

| 4,077,927 A | 3/1978 | McPherson |
| 4,910,287 A | 3/1990 | McLafferty et al. |

(Continued)

FOREIGN PATENT DOCUMENTS

| EP | 2290000 | 3/2011 |
| GB | 1 298 325 | 11/1972 |

(Continued)

OTHER PUBLICATIONS

Supplementary Search Report for European Application No. 12855645, dated Jul. 6, 2015.

(Continued)

*Primary Examiner* — Alexandre Ferre
(74) *Attorney, Agent, or Firm* — Klarquist Sparkman, LLP

(57) ABSTRACT

One embodiment is a pressure sensitive adhesive construct comprising:
(a) a backing substrate; and
(b) a pressure sensitive adhesive composition disposed on the backing substrate, wherein the pressure sensitive adhesive composition includes a product made from
 (i) at least one epoxidized vegetable oil and;
 (ii) a dimer acid or anhydride thereof, a trimer acid or anhydride thereof, a polymerized fatty acid or anhydride thereof, or a mixture thereof.

(Continued)

A further embodiment is a pressure sensitive adhesive construct comprising:
(A) a backing substrate; and
(B) a pressure sensitive adhesive composition disposed on the backing substrate, wherein the pressure sensitive adhesive composition includes a product made from
(i) at least one epoxidized vegetable oil and;
(ii) a prepolymer or oligomer capped with a carboxylic acid group at both prepolymer or oligomer chain ends, or a branched prepolymer or oligomer with at least two of the prepolymer or oligomer branches and chain ends capped with a carboxylic acid group, wherein the carboxylic acid-capped prepolymer or oligomer is made from (a) a dibasic acid reacted with (b) a glycidyl or an epoxidized compound having at least two epoxy groups, a diol or polyol, a diamine, or a combination thereof.

40 Claims, 1 Drawing Sheet

(51) Int. Cl.
| | | |
|---|---|---|
| | *C09J 7/02* | (2006.01) |
| | *C09J 191/00* | (2006.01) |
| | *C08G 63/42* | (2006.01) |
| | *C08G 59/42* | (2006.01) |
| | *C09J 167/08* | (2006.01) |

(52) U.S. Cl.
CPC ............ *C09J 7/0207* (2013.01); *C09J 167/08* (2013.01); *C09J 191/00* (2013.01); *B32B 2037/268* (2013.01); *C09J 2467/00* (2013.01); *C09J 2491/00* (2013.01); *Y10T 428/287* (2015.01)

(56) References Cited

U.S. PATENT DOCUMENTS

| | | |
|---|---|---|
| 5,218,063 A | 6/1993 | Kimball |
| 5,223,558 A | 6/1993 | Ohba |
| 6,121,398 A * | 9/2000 | Wool .................. C08F 290/144 106/125.1 |
| 6,255,367 B1 | 7/2001 | Bitler et al. |
| 6,427,599 B1 | 8/2002 | Posson et al. |
| 7,122,592 B2 | 10/2006 | Wentworth et al. |
| 7,163,720 B1 | 1/2007 | Dhaler et al. |
| 2002/0188056 A1* | 12/2002 | Wool .................. C08K 5/0008 524/556 |
| 2008/0131639 A1 | 6/2008 | Yamamoto et al. |
| 2011/0135924 A1 | 6/2011 | Takahira et al. |
| 2011/0244160 A1 | 10/2011 | Ishiguro et al. |
| 2012/0232226 A1 | 9/2012 | Takahira et al. |
| 2013/0078464 A1 | 3/2013 | Li et al. |
| 2014/0057101 A1 | 2/2014 | Koch et al. |

FOREIGN PATENT DOCUMENTS

| | | |
|---|---|---|
| JP | 58001739 A | 1/1983 |
| JP | 2000080242 | 3/2000 |
| JP | 2008-202015 | 9/2008 |
| JP | 2008-297363 | 12/2008 |
| WO | WO 01/37991 | 5/2001 |
| WO | WO 2005/061646 | 7/2005 |
| WO | WO 2006/068483 | 6/2006 |
| WO | WO 2008/144703 | 11/2008 |
| WO | WO 2011/023255 | 3/2011 |
| WO | WO 2011/156378 | 12/2011 |
| WO | WO 2012/024301 | 2/2012 |
| WO | WO 2013/086004 | 6/2013 |
| WO | WO 2013/086012 | 6/2013 |

OTHER PUBLICATIONS

U.S. Appl. No. 13/701,782, filed Mar. 28, 2013, Li et al.
U.S. Appl. No. 13/706,299, filed Feb. 27, 2014, Koch et al.
Baumann et al., "Natural Fats and Oils—Renewable Raw Materials for the Chemical Industry," *Angew. Chem. Int. Ed. Engl.* 27:41-62, 1988.
Biermann et al., "New Syntheses with Oils and Fats as Renewable Raw Materials for the Chemical Industry," *Angew. Chem. Int. Ed.* 39:2206-2224, 2000.
International Search Report and Written Opinion from International application No. PCT/US2012/067976, dated Feb. 21, 2013, 7pp.
International Search Report and Written Opinion of the International Searching Authority for International Application No. PCT/US2011/039450, dated Aug. 2, 2012.
International Search Report and Written Opinion of the International Searching Authority for International Application No. PCT/US2012/067961, dated Mar. 4, 2013, 7pp.
Liu et al., "Solid freeform fabrication of epoxidized soybean oil/epoxy composite with bis or polyalkyleneamine curing agents," *Composites* Part A 38:87-93, 2007.
Meier et al., "Plant oil renewable resources as green alternatives in polymer science," *Chemical Society Reviews* 36:1788-1802, 2007 (Published online Jul. 23, 2007).
Merfeld et al., "Acid/epoxy reaction catalyst screening for low temperature (120 °C) powder coatings," *Progress in Organic Coatings* 52(2):98-109, Feb. 1, 2005.
Metzger et al., "Lipids as renewable resources: current state of chemical and biotechnological conversion and diversification," *Appl Microbiol Biotechnol* 71:13-22, 2006 (Published online Apr. 8, 2006).
Shogren et al., "Biodegradation Behavior of Some Vegetable Oil-based Polymers," *Journal of Polymers and the Environment* 12(3):173-178, 2004.

* cited by examiner

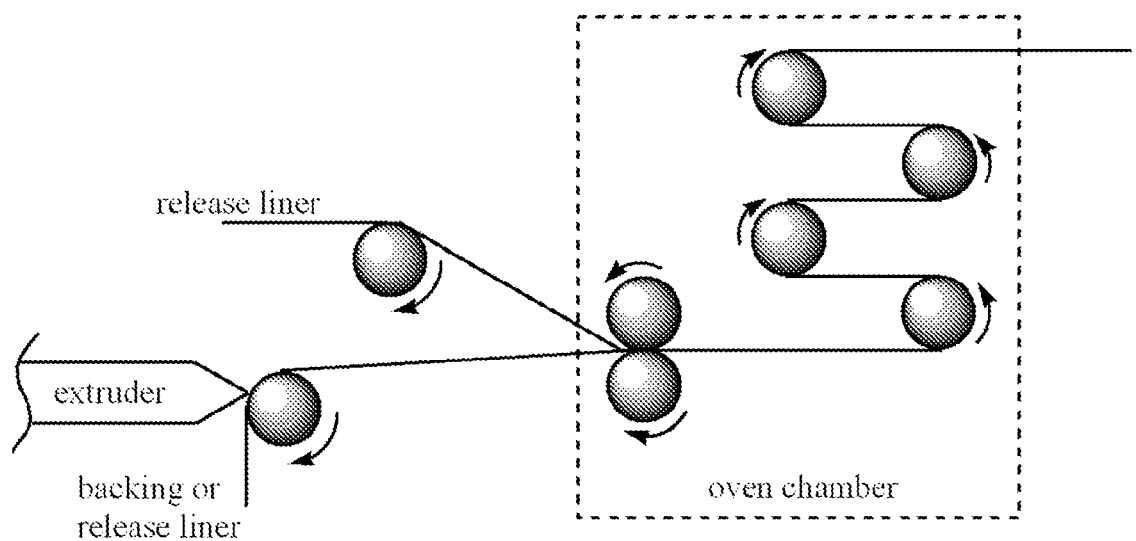

VEGETABLE OIL-BASED PRESSURE-SENSITIVE ADHESIVES

CROSS REFERENCE TO RELATED APPLICATION

This is the U.S. National Stage of International Application No. PCTUS2012067976, filed Dec. 5, 2012, which was published in English under PCT Article 21(2), which in turn claims the benefit of U.S. Provisional Application No. 61/568,099 filed Dec. 7, 2011, which is incorporated herein in its entirety.

BACKGROUND

A pressure sensitive adhesive (PSA) (also known as "self-adhesive" or "self stick adhesive") is a non-reactive adhesive which forms a bond at room temperature with a variety of dissimilar surfaces when light pressure is applied. No solvent, heat or radiation is needed to activate the adhesive. It finds wide applications in pressure-sensitive tapes and/or foils, general purpose labels, note pads, automobile trim, packaging, medical, and a wide variety of other products.

Nowadays, most commercially available PSAs are derived from rubber, acrylic, modified acrylic, and silicone-based formulations, which are predominately made from petrochemical-based polymers. Given that petroleum and natural gas are depleting nonrenewable resources with naturally limited supply and increasing cost, it is desirable to provide PSA compositions that can be made from renewable natural materials. In addition, it is highly desirable that the manufacture and use of PSA do not generate environmental pollution.

Vegetable oils are one of the most abundant renewable materials. Approximately 20 billion pounds are produced annually in the United States. At present, less than 600 million pounds of soybean oil is used in industrial application. Therefore, there is plenty of soybean oil available for new industrial uses.

Vegetable oil is mainly a mixture of triglycerides with varying composition of long-chain saturated and unsaturated fatty acids depending on the plant, the crop, and the growing conditions. The double bonds in unsaturated fatty acids may be converted into more reactive oxirane moieties (the epoxy functional groups) by appropriate reactions. Epoxidized vegetable oils (EVOs) such as epoxidized soybean oil (ESO) are commercially available and are widely used in rubbers, plastics, resins, coatings, and various thermosetting composites.

The use of vegetable oils as starting materials for making PSAs has numerous advantages such as low cost, low toxicity, inherent biodegradability, and fairly high purity. Three general approaches for making PSAs from vegetable oils have been disclosed (see WO 2008/144703). In the first approach, free-radically polymerizable functional groups such as acrylate or methacrylate groups are first introduced onto fatty acid, fatty esters or vegetable oils and then polymerized via a free radical polymerization method such as ultraviolet radiation to form PSAs. The introduction of the functional groups is typically accomplished through the reaction between epoxidized fatty esters or epoxidized oils and acrylic acid/methacrylic acid. During the polymerization, various acrylic or methacrylic monomers may be used to co-polymerize with acrylated fatty esters/fatty acids/oils. In this approach, petrochemical-based acrylate is still used. This approach is considered as an extension of traditional free radical polymerization methods of making petrochemical-based PSAs. In the second approach, fatty ester or vegetable oils are first epoxidized. The epoxidized fatty esters or epoxidized vegetable oils are then polymerized to form PSAs through cationically catalyzed ring-opening polymerization of the epoxy rings. Some other epoxy compounds may be copolymerized with epoxidized fatty esters or epoxidized vegetable oils for improving the properties of PSAs. The third approach involves the direct polymerization of carbon-carbon double bonds on fatty acids, fatty esters or vegetable oils with other free-radically polymerizable compounds such as acrylate or methacrylate. Unlike those in drying oils such as Tung oil, most carbon-carbon double bonds in vegetable oils are not conjugated, thus having relatively low reactivity during the free radical polymerization. In this third approach, fatty acids, fatty esters or vegetable oils have to be modified to form conjugated double bonds before the free radical polymerization.

SUMMARY

Disclosed herein are pressure sensitive adhesive compositions, pressure sensitive adhesive constructs, methods for making pressure sensitive adhesive compositions and methods for making pressure sensitive adhesive constructs.

One embodiment disclosed herein is a pressure sensitive adhesive construct comprising:
(A) a backing substrate; and
(B) a pressure sensitive adhesive composition disposed on the backing substrate, wherein the pressure sensitive adhesive composition includes a product made from
   (i) at least one epoxidized vegetable oil and;
   (ii) a dimer acid or anhydride thereof, a trimer acid or anhydride thereof, a polymerized fatty acid or anhydride thereof, or a mixture thereof.

An additional embodiment disclosed herein is a pressure sensitive adhesive construct comprising:
(A) a backing substrate; and
(B) a pressure sensitive adhesive composition disposed on the backing substrate, wherein the pressure sensitive adhesive composition includes a product made from
   (i) at least one epoxidized vegetable oil and;
   (ii) a prepolymer or oligomer capped with a carboxylic acid group at both prepolymer or oligomer chain ends, or a branched prepolymer or oligomer with at least two of the prepolymer or oligomer branches and prepolymer or oligomer chain ends capped with a carboxylic acid group, wherein the carboxylic-acid capped prepolymer or oligomer is made from (a) an excess of a dibasic acid reacted with (b) glycidyl or epoxidized compound having at least two epoxy groups, a diol or polyol, a diamine, or a combination thereof.

A further embodiment disclosed herein is a pressure sensitive adhesive construct comprising:
(I) a backing substrate; and
(II) a pressure sensitive adhesive composition disposed on the backing substrate, wherein the pressure sensitive adhesive composition comprises a crosslinked polyester condensation product that includes
   (A) an epoxidized vegetable oil component and;
   (B) a component selected from:
      (i) a dimer acid or anhydride thereof, a trimer acid or anhydride thereof, a polymerized fatty acid or anhydride thereof, or a mixture thereof;
      (ii) a prepolymer or oligomer capped with a carboxylic acid group at both prepolymer or oligomer chain ends, or a branched prepolymer or oligomer with at least two of the prepolymer or oligomer branches and prepolymer or oligomer chain ends capped with a carboxylic acid group, wherein the carboxylic acid-capped prepolymer or oligomer is made from a (a) an excess of a dibasic acid reacted with (b) glycidyl or epoxidized compound having at least two epoxy groups, a diol or polyol, a diamine, or a combination thereof; or (iii) a combination of (i) and (ii).

An additional embodiment disclosed herein is a method for making a pressure sensitive adhesive construct comprising:

reacting (i) at least one epoxidized vegetable oil with (ii) a dimer acid or anhydride thereof, a trimer acid or anhydride thereof, a polymerized fatty acid or anhydride thereof, or a mixture thereof; and forming on a backing substrate a pressure sensitive adhesive from the resulting reaction product.

Another embodiment disclosed herein is a method for making a pressure sensitive adhesive composition comprising:

(a) reacting a (i) dibasic acid with (ii) at least one agent to provide a prepolymer or oligomer capped with a carboxylic acid group at both prepolymer or oligomer chain ends, or a branched prepolymer or oligomer with at least two of the prepolymer or oligomer branches chain ends capped with a carboxylic acid group; and (b) reacting at least one epoxidized vegetable oil with the carboxylic acid-capped prepolymer or carboxylic acid-capped oligomer to produce a pressure sensitive adhesive composition.

Also disclosed herein is a method for making a pressure sensitive adhesive composition comprising:

reacting (i) at least one epoxidized vegetable oil with (ii) a dimer acid or anhydride thereof, a trimer acid or anhydride thereof, a polymerized fatty acid or anhydride thereof, or a mixture thereof to produce a pressure sensitive adhesive composition, wherein the amount of component (ii) reacted with the epoxidized vegetable oil is in a molar ratio of carboxyl groups in component (ii) to epoxy groups in component (i) of from 3:1 to 1:3.

Another embodiment disclosed herein is a method for making a pressure sensitive adhesive composition comprising:

(a) reacting at least one epoxidized vegetable oil with at least one monobasic acid or anhydride thereof resulting in a modified epoxidized vegetable oil; and (b) reacting the modified epoxidized vegetable oil with (i) a dimer acid or anhydride thereof, a trimer acid or anhydride thereof, a polymerized fatty acid or anhydride thereof, or a mixture thereof, or (ii) a prepolymer or oligomer capped with a carboxylic acid group at both prepolymer or oligomer chain ends, or a branched prepolymer or oligomer with at least two of the prepolymer or oligomer branches and chain ends capped with a carboxylic acid group, to produce a pressure sensitive adhesive composition.

Also disclosed herein is a method comprising applying the pressure sensitive adhesive disclosed herein to a first substrate and then adhesively bonding the pressure sensitive adhesive-applied first substrate to a second substrate.

The foregoing will become more apparent from the following detailed description, which proceeds with reference to the accompanying figures.

BRIEF DESCRIPTION OF THE DRAWINGS

FIG. 1 illustrates a combination of reactive extrusion and reactive calendar for the preparation of PSA and PSA constructs as disclosed herein.

DETAILED DESCRIPTION

As used herein, the singular terms "a," "an," and "the" include plural referents unless context clearly indicates otherwise. Also, as used herein, the term "comprises" means "includes."

The term "aliphatic" is defined as including alkyl, alkenyl, alkynyl, halogenated alkyl and cycloalkyl groups as described above. A "lower aliphatic" group is a branched or unbranched aliphatic group having from 1 to 10 carbon atoms.

The term "alkyl" refers to a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is a saturated branched or unbranched hydrocarbon having from 1 to 10 carbon atoms. Preferred alkyl groups have 1 to 4 carbon atoms. Alkyl groups may be "substituted alkyls" wherein one or more hydrogen atoms are substituted with a substituent such as halogen, cycloalkyl, alkoxy, amino, hydroxyl, aryl, or carboxyl.

The term "aryl" refers to any carbon-based aromatic group including, but not limited to, phenyl, naphthyl, etc. The term "aryl" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorous. The aryl group can be substituted with one or more groups including, but not limited to, alkyl, alkynyl, alkenyl, aryl, halide, nitro, amino, ester, ketone, aldehyde, hydroxy, carboxylic acid, or alkoxy, or the aryl group can be unsubstituted.

The term "cycloalkyl" refers to a non-aromatic carbon-based ring composed of at least three carbon atoms. Examples of cycloalkyl groups include, but are not limited to, cyclopropyl, cyclobutyl, cyclopentyl, cyclohexyl, and the like. The term "heterocycloalkyl group" is a cycloalkyl group as defined above where at least one of the carbon atoms of the ring is substituted with a heteroatom such as, but not limited to, nitrogen, oxygen, sulfur, or phosphorous.

"Heteroalkyl" means an alkyl group wherein at least one carbon atom of the otherwise alkyl backbone is replaced with a heteroatom, for example, O, S or N.

Prepolymers, as described herein, may be reaction product mixtures after pre-polymerization but prior to (further) polymerization and curing reaction. The reaction mixtures can consist of polymers of a wide spectrum of molecular weights. Oligomers have a low degree of polymerization (relatively low molecular weight). Prepolymer mixtures can include or consist of oligomers.

Disclosed herein are new PSA compositions based on epoxidized vegetable oils (EVOs), and methods for the preparation of PSA formulations, PSA tapes and/or foils thereof, and other PSA products. In general, an EVO is reacted with a dimer acid, a trimer acid and/or polymerized fatty acid resulting in a PSA. For example, disclosed herein are methods of making PSA products by reacting at least one EVO with a dimer acid, or by first pre-polymerizing a dimer acid with at least one diepoxy to produce a thermoplastic epoxy polymer or oligomer capped with carboxylic acid groups at both chain ends, followed by curing the resulting thermoplastic epoxy polymer or oligomer with at least one EVO. The chemical structure of the products is particularly designed to meet the criteria for application as PSAs. The polymers of the compositions generally possess glass transition temperatures $T_g$ at or below room temperature and have appropriate density of chemical and/or physical cross-links, which render the polymers a balance between sufficient cohesive strength ("dry") and good initial tack and adhesive power. For example, the $T_g$ of the PSA compositions may be from −100 to 50° C., preferably from −80 to 40° C., more preferably from −50 to 30° C. It should be noted that, $T_g$ of the PSAs should be fine-tuned to meet various demands of final PSA products. For example, preferred PSA for use in low peel labels will have a $T_g$ of from −50 to −30° C. Preferred PSAs for use in freezer labels will have a $T_g$ of from −45 to −30° C. Preferred PSAs for use in cold temperature labels will have a $T_g$ of from −25 to −10° C. Preferred PSAs for use in PSA tapes will have a $T_g$ of from −10 to 10° C. Preferred PSAs for use in high peel labels will have a $T_g$ of from 0 to 10° C. Preferred PSAs for use in disposables will have a $T_g$ of from 10 to 30° C. The crosslinking density is appropriate for PSA in terms that the final composition has an appropriate $T_g$ which is described above, sufficient cohesive strength, and good initial tack and adhesive powder. Furthermore, the cross-linking density of the composition can be fine-tuned to meet the criteria for PSAs and various demands of final PSA products Certain embodiments disclosed herein enable the direct production of PSAs from reactions of EVOs with a dimer acid or anhydride thereof, a trimer acid or anhydride thereof, a polymerized fatty acid or anhydride thereof, or a mixture thereof, or a prepolymer or oligomer capped with a carboxylic acid group at both chain ends derived from a dibasic acid reacting with a diglycidyl ether, a diepoxy compound, a diol, a diamine, or a combination thereof, or branched or hyperbranched polymers or oligomers with at least two of the branches and chain ends capped with a carboxylic acid group derived from a polybasic acid reacting with a glycidyl or epoxidized compound having at least two epoxy groups, a diol or polyol, a diamine, or a combination thereof. Further reaction of the EVO/"dibasic acid" reaction product is unnecessary to enable their use as PSAs.

Certain embodiments of the PSA adhesive compositions disclosed herein exhibit adhesiveness or tackiness at room temperature, are odorless, are not made with organic solvents and/or toxic catalysts, consist of only renewable materials (i.e., they are not produced or derived from a fossil fuel such as a petrochemical or a coal-based chemical).

In one embodiment the PSA compositions include a polyester condensation product prepared at elevated temperatures of at least one EVO and a dimer acid, a trimer acid and/or polymerized fatty acid resulting in a PSA, and optionally at least one monobasic acid or its anhydride derivative.

The EVO may be made from a vegetable oil by converting at least a portion of vegetable oil's double bonds into more reactive oxirane moieties. In particular embodiments, "EVO" generally refers to any derivative of vegetable oils whose double bonds are fully or partly epoxidized using any method, e.g. so called in situ performic acid process, which is the most widely applied process in industry. Herein, "vegetable oil" refers to a group of polyunsaturated triglycerides, which are composed of three fatty acids connected to a glycerol molecule. Typically, the fatty acids are long chain (C12 to C24 or even longer) materials with multiple double bonds per chain. The vegetable oil can be palm oil, olive oil, canola oil, corn oil, cottonseed oil, soybean oil, linseed oil, rapeseed oil, castor oil, coconut oil, palm kernel oil, rice bran oil, safflower oil, sesame oil, sunflower oil, or other polyunsaturated vegetable oils (both naturally existing and genetically modified), or mixtures thereof. Suitable polyunsaturated triglycerides that can also be used as the "EVO" component may also include unsaturated oils of marine origin, such as menhaden, sardine, and herring oil. In certain embodiments, more than one EVO can be utilized in a single mixture if desired. EVOs generally have a functionality (including epoxy groups and possibly hydroxyl groups thereof) well above two, which can result in polymers with fairly high density of cross-linking when polymerized with dimer acids, trimer acids, and/or polymerized fatty acids, and therefore increase the modulus of the polymers and decrease their utility as PSAs. Therefore, in some embodiments, modifications of the composition are performed and/or reaction conditions are optimized to obtain polyesters with appropriate density of cross-linking which are appropriate for PSA compositions. The cross-linking density and/or polymer modulus is appropriate for PSA such that the final composition has an appropriate $T_g$ which is described above, sufficient cohesive strength, and good initial tack and adhesive powder. Furthermore, the cross-linking density and/or polymer modulus can be fine-tuned to meet the criteria for PSAs and various demands of final PSA products. EVOs such as ESO and epoxidized linseed oil are also readily available from commercial suppliers such as Spectrum Chemical Mfg Corp, California, and Sigma-Aldrich Corp, Missouri.

The EVO may contain about 1.5 to about 6 epoxy groups (or even more) per triglyceride. It is preferred that the EVO contain functionality (epoxy number) of 2 to 5, more preferably 2.5 to 4.5. The epoxy functionality of EVO can be controlled by epoxidizing less than all of the double bonds of the starting vegetable oils. Or, according to particular embodiments, the EVOs with high functionality used in the present PSA compositions may optionally be modified by reacting with at least one monobasic acid or its anhydride derivatives ("modifier"), to lower their epoxy functionality, and to reduce the rate and density of cross-linking in the following polymerization with dimer acids, trimer acids, and/or polymerized fatty acids as described below in more detail. The epoxy functionality of EVO (or modified EVO) determines the rate and density of cross-linking in the polymerizations of EVO and dimer acids, trimer acids, and/or polymerized fatty acids. The use and amount of a modifier and the choices of the polymerization temperature and time are also among the factors that eventually determine the properties of the PSAs.

In certain embodiments, the EVO (which may be a modified EVO as described herein) is reacted with a dimer acid, a trimer acid, and/or a polymerized fatty acid. These compounds may contain two or more carboxylic acid functional groups per molecule, which include without limitation, dimer acids, trimer acids, polymerized fatty acids (including their saturated forms obtained via hydrogenation), or mixtures thereof. Dimer acids, or dimerized fatty acids, are dicarboxylic acids that may be prepared by dimerizing unsaturated fatty acids, usually on clay catalysts (e.g., montmorillonite clay). Likewise, trimer acids and polymerized fatty acids are corresponding products where the resulting molecules consist of three and more fatty acid molecules, respectively. Although trimer acids and polymerized fatty acids consist of three and more carboxylic acid groups, respectively, they can also be considered to be "dibasic acids" from the viewpoint of polycondensation chemistry. Tall oil fatty acids (consisting mainly of oleic and linoleic acids) and other fatty acids from vegetable oils (e.g., erucic acid, linolenic acid), marine oils or tallow (e.g., high oleic tallow) can be starting materials to prepare dimer acids, trimer acids and polymerized fatty acids or mixtures thereof. (see, e.g, "Preparation of Meadowfoam Dimer Acids and Dimer Esters and Their Use as Lubricants" by D. A. Burg and R. Kleiman (*JAOCS*. 1991), "Fats and oils as oleochemical raw materials" by K. Hill (*Pure Appl. Chem.* 2000)). The fact that dimer acid, trimer acids or polymerized fatty acids can be produced or derived from vegetable oil means that the PSA composition may be made entirely from renewable sources.

In certain embodiments, the dimer acid is a dimer of an unsaturated fatty acid or a mixture of the dimer and a small amount (up to 10 weight percent) of a monomer or trimer of the unsaturated fatty acid. The trimer acid is a timer of an unsaturated fatty acid or a mixture of the trimer and a small amount (up to 10 weight percent) of a monomer or dimer of the unsaturated fatty acid. A polymerized fatty acid contains four or more unsaturated fatty acid residues. The dimer acid, trimer acid or polymerized fatty acid may be a mixture of dimerized, trimerized or polymerized unsaturated fatty acids. Preferable unsaturated fatty acids include carboxylic acids having 12 to 24 carbon atoms and at least one unsaturated bond per molecule. Preferable acids having one unsaturated bond include, for example, oleic acid, elaidic acid and cetoleic acid. Preferable fatty acids having two unsaturated bonds include sorbic acid and linoleic acid. Preferable fatty acid having three or more of unsaturated bonds include linoleinic acid and arachidonic acid. The dimer acid, trimer acid, or polymerized fatty acid may be partially or fully hydrogenated. Illustrative dimer acids have the structure:

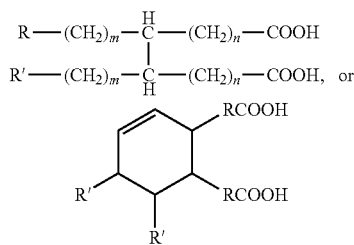

where R and R' are the same or different, saturated, unsaturated or polyunsaturated, straight or branched alkyl groups having from 1 independently to 30 carbon atoms, and n, m, n' and m' are the same or different, ranging from 0 to 20. There may be more than one C—C crosslink between the monofunctional carboxylic acid moieties. Alternatively, R and R' are the same or different, saturated, unsaturated or polyunsaturated, straight alkyl groups having from 1 independently to 20 carbon atoms, or having from 1 independently to 8 carbon atoms; n and m are the same or different, ranging from 1 independently to 10, or ranging from 4 independently to 16. In other non-limiting embodiments R may be butyl and R' may be octyl; n may be 8 and m may be 14.

In another embodiment, the dimer acid may have the definition found in U.S. Pat. No. 3,287,273, incorporated herein in its entirety by reference. Such commercial dimer acids are generally produced by the polymerization of unsaturated $C_{18}$ fatty acids to form $C_{36}$ dibasic dimer acids. Depending on the raw materials used in the process, the $C_{18}$ monomeric acid may be linoleic acid or oleic acid or mixtures thereof. The resulting dimer acids may therefore be the dimers of linoleic acid, oleic acid or a mixture thereof.

Illustrative dimer acids include:

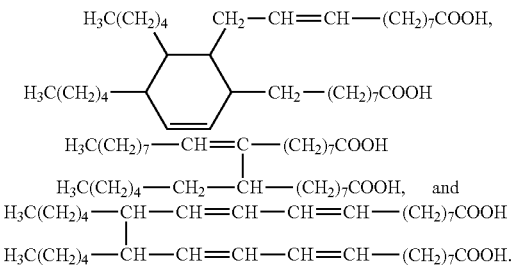

The structure of the trimer acids and polymerized fatty acids include three and more unsaturated fatty acid residues. They can be reaction products between unsaturated fatty acids, dimer acids thereof, and/or trimer acids and polymerized fatty acids thereof, via Diels-Alder and/or radical mechanism.

According to other embodiments, the EVO (which may be a modified EVO as described herein) is reacted with a carboxylic acid-capped prepolymer or carboxylic acid-capped oligomer to produce a PSA, wherein the carboxylic acid-capped prepolymer or carboxylic acid-capped oligomer is derived from reacting an excess of a dibasic acid with at least one agent to provide a prepolymer or oligomer capped with a carboxylic acid group at both prepolymer or oligomer chain ends. The carboxylic acid-capped prepolymer or carboxylic acid-capped oligomer can then itself function as a "dibasic acid." Preferably, the prepolymer or oligomer is terminated with the monomeric dibasic acid initial reactant so that the prepolymer or oligomer is capped with a carboxylic acid group at both chain ends. The prepolymer or oligomer is a polycondensated product that is terminated with the monomeric dibasic acid such that the chain ends are a moiety of the dibasic acid (i.e., carboxylic acid groups). The pre-polymerization can introduce "hard" segments/block into the polymer, and thus increase the strength and modulus to the final PSAs. For example, the PSA product may be made by initially pre-polymerizing a dimer acid with at least one diepoxy to produce a thermoplastic epoxy polymer or oligomer capped with carboxylic acid groups at both chain ends, followed by curing the resulting thermoplastic epoxy polymer or oligomer with at least one epoxidized vegetable oil.

The dibasic acids used in the preparation of the PSAs may include any compound that contains two carboxylic acid functional groups, and derivatives or analogs thereof. Compounds that include two displaceable active hydrogen atoms per molecule but the hydrogen atoms are not part of a carboxylic acid moiety are also considered to be dibasic acids from the viewpoint of polycondensation chemistry. For example, the "displaceable active hydrogen atoms" can be part of hydroxyl groups (—OH), amine groups (—NHR and —$NH_2$), or thiol groups (—SH), sulfonamides, etc. More than one dibasic acid can be utilized in a single mixture if desired. Dibasic acids can be aliphatic (linear, branch or cyclic) saturated carboxylic acids containing up to 30 carbon atoms, preferably 2 to 22 carbon atoms, e.g., oxalic acid, malonic acid, itaconic acid, succinic acid, glutaric acid, adipic acid, pimelic acid, suberic acid, azelaic acid, sebacic acid, brassylic acid, and docosanedioic acid.

Dibasic acids may also be aromatic acids and derivatives thereof, including without limitation, phthalic acid, isophthalic acid and terephthalic acid. Dibasic acid can also be produced from other derivatives such as anhydrides. Specific examples include without limitation succinic anhydride, itaconic anhydride, and phthalic anhydride. The dibasic acids or anhydride derivatives are preferably derived from natural resources. In addition to the high energy-consuming traditional processes for the production of dibasic acids, alternative accesses to various dibasic acids from renewable feedstocks have been well reported (see, e.g, "Lipids as renewable resources: current state of chemical and biotechnological conversion and diversification" by J. O. Metzger and U. Bornscheuer (*Appl. Microbiol. Biotechnol.* 2006)). Tribasic or higher H-functionality acids include without limitation, 1,2,3,4-butanetetracarboxylic acid, ethylenediamine tetraacetic acid, citric acid, trimer acids, polymerized fatty acids, etc. Those obtained or derived from renewable raw materials are preferred, e.g., trimer acids, polymerized fatty acids, and citric acid. Citric acid is a tribasic organic acid, existing in a variety of fruits and vegetables, most notably citrus fruits. It is a commodity chemical produced and consumed throughout the world; the global production of citric acid in 2007 was over 1.6 million tones, and the world demand is still in rapid increasing (see, e.g., "citric acid production" by M. Berovic and M. Legisa (*Biotechnol. Annu. Rev.* 2007). "Dibasic acids" is also inclusive of the dimer acids, trimer acid, and polymerized fatty acids described above.

Pre-polymerization of an excess of tribasic or higher H-functionality acid with an appropriate agent (e.g., diepoxides or polyepoxides) can result in soluble and/or thermoplastic branched (which may be hyperbranched) polymers or oligomers with at least two or all of the branches and chain ends capped with carboxylic acid groups. For example, one branch and one chain end may each be capped with a carboxylic acid group. In another example, two or more branches may each be capped with a carboxylic acid group. In a further example, no branches but each chain end may be capped with a carboxylic acid group. By careful selection of the monomer pairs, design of the monomer feed ratio, and optimization of the reaction conditions and operations, a rich array of soluble and/or thermoplastic branched or hyperbranched polymers or oligomers with at least two or all of the branches and chain ends capped with carboxylic acid groups, can be obtained. In certain embodiments, the carboxylic acid groups may be present as pendant groups.

Illustrative agents useful to prepare the carboxylic acid-capped prepolymer or oligomer include diepoxies or polyepoxides such as a glycidyl or epoxidized compound having at least two epoxy groups; a diol or polyol; and a diamine.

Illustrative diepoxies are diglycidyl ethers and epoxidized compounds having at least two epoxy groups, such as bisphenol A diglycidyl ether, bisphenol F diglycidyl ether, bisphenol A propoxylate diglycidyl ether, bisphenol A ethoxylate diglycidyl ether, diethylene glycol diglycidyl ether, 1,3-butanediol diglycidyl ether, 1,4-butanediol diglycidyl ether, poly(ethylene glycol) diglycidyl ether, poly (propylene glycol) diglycidyl ether, neopentyl glycol diglycidyl ether, glycerol diglycidyl ether, diglycidyl 1,2,3,6-tetrahydrophthalate, 1,2-cyclohexanedicarboxylate diglycidyl ether, 1,4-cyclohexanedimethanol diglycidyl ether, resorcinol diglycidyl ether, poly(dimethylsiloxane) terminated with diglycidyl ether, epoxidized linoleic acid ester, and epoxidized vegetable oils with two epoxy functional groups. In addition, the following compounds are also employed as diepoxies from the viewpoint of polycondensation chemistry: tribasic or higher epoxy-functionality compounds, e.g., trimethylolpropane triglycidyl ether, trimethylolethane triglycidyl ether, N,N-Diglycidyl-4-glycidyloxyaniline, tris(4-hydroxyphenyl)methane triglycidyl ether, tris(2,3-epoxypropyl)isocyanurate, epoxidized vegetable oils, epoxidized fatty acid esters having no less than two epoxy functional groups, like epoxidized linolenic acid ester, etc.

Illustrative repeating units for the prepolymers or oligomers described above derived from diepoxides or polyepoxides are represented as follows:

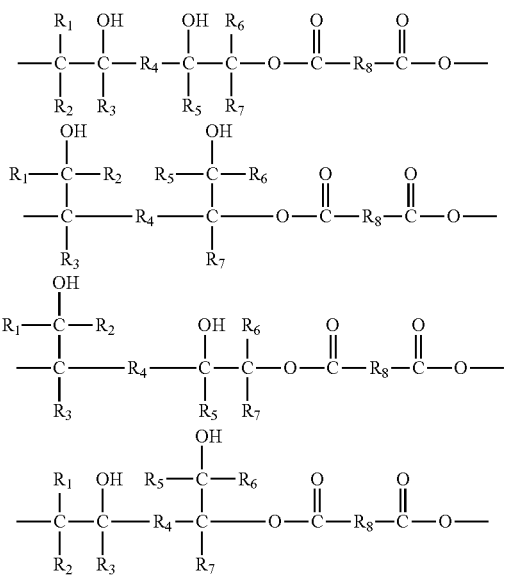

wherein each of $R_1$, $R_2$, $R_3$, $R_4$, $R_5$, $R_6$, $R_7$, and $R_8$ independently represents hydrogen or a substituted or unsubstituted alkyl or heteroalkyl group.

Illustrative diols (or glycols) include without limitation, ethylene glycol, 1,4-butanediol, 1,5-pentanediol, 1,8-octanediol, 1,2-propanediol, 1,2-butanediol, 2,3-butanediol, 1,3-butanediol, 1,2-pentanediol, ethohexadiol, p-menthane-3,8-diol, 2-methyl-2,4-pentanediol, etc. Illustrative polyols include without limitation, glycerin, trimethylolpropane, pentaerythritol, maltitol, sorbitol, xylitol, and isomalt.

An illustrative repeating unit for the pre-polymers or oligomers described above derived from diols is represented as follows:

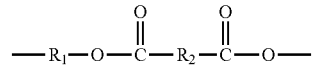

wherein each of $R_1$ and $R_2$ independently represents hydrogen or a substituted or unsubstituted alkyl or heteroalkyl group.

Illustrative diamines include without limitation, 1,2-diaminoethane, 1,3-diaminopropane, butane-1,4-diamine, pentane-1,5-diamine, hexane-1,6-diamine, 1,2-diaminopropane, diphenylethylenediamine, diaminocyclohexane, o-xylylenediamine, m-xylylenediamine, p-xylylenediamine, o-phenylenediamine, m-phenylenediamine, p-phenylenediamine, 2,5-diaminotoluene, dimethyl-4-phenylenediamine, N,N'-di-2-butyl-1,4-phenylenediamine, 4,4'-diaminobiphenyl, 1,8-diaminonaphthalene, and other compounds having two or more primary amino groups (—$NH_2$).

An illustrative repeating unit for the pre-polymers or oligomers described above derived from diamines is represented as follows:

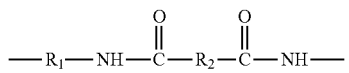

wherein, each of $R_1$ and $R_2$ independently represents hydrogen or a substituted or unsubstituted homoalkyl or heteroalkyl group.

The monobasic acid which may form a part of the PSA compositions (e.g., as a "modifier" in certain embodiments) may be any of the organic compounds that contain only one carboxyl group, e.g., free acids or derivatives thereof. More than one monobasic acid can be utilized in a single mixture if desired. The monobasic acid can be an aliphatic (linear, branch or cyclic) saturated acid containing up to 36 carbon atoms, preferably 1 to 24 carbon atoms, e.g. formic acid, acetic acid, propionic acid, butyric acid, valeric acid, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid, arachidic acid, heneicosylic acid, behenic acid, tricosylic acid, and lignoceric acid. The monobasic acid can also be aromatic acids and derivatives thereof, such as benzoic acid, naphthalene acid, and derivatives thereof. As is understood by those of ordinary skills in the art, monobasic acid can also be produced from other derivatives such as anhydrides. Specific examples include without limitation, acetic anhydride and propionic anhydride. The monobasic acid is preferably derived from natural resources. For example, free fatty acid can be obtained by hydrolysis of natural fats and oils derived from plant or animal sources. In this connection, mixtures of free fatty acids or their esters may also be utilized as starting materials for the sake of cost effectiveness, although the saturated fatty acids are preferred.

In particular embodiments, in addition to the (i) EVO, (ii) dimer acid, trimer acid and/or polymerized fatty acid (or carboxylic acid-capped dibasic acid-derived prepolymer or oligomer), (iii) and, optionally, monobasic acid, the reaction mixture can also contain from about 0.05 to 10.0, more particularly 0.1 to 10.0, parts by weight of a catalyst, preferably from about 0.1 to 2 parts by weight, based on the weight of the reactants, especially when the reaction is performed at low temperatures (e.g., <120° C.). The catalyst can reduce the cure time of the reaction mixture (e.g., to a cure time of 1 to 6 minutes). Several catalysts can be used to effectively catalyze the reaction between carboxylic acid groups or anhydride groups (from the dimer acid, trimer acid and/or polymerized fatty acid (or carboxylic acid-capped dibasic acid-derived prepolymer or oligomer), and epoxy groups (from the EVO). These catalysts can be:

(1) amines, especially tertiary amines,—examples include but are not limited to, triethylamine, trimethylamine, tri-n-pentylamine, trioctylamine, tridecylamine, tridodecylamine, trieicosylamine, docosyldioctylamine, triacontyldibutylamine, 2-ethylhexyl di-n-propylamine, isopropyl di-n-dodecylamine, isobutyl di-n-eicosylamine, 2-methyldocosyl di-(2-ethylhexyl)amine, triacontyl di-(2-butyldecyl)amine, n-octadecyl di-(n-butyl)amine, n-eicosyl di-(n-decyl)amine, n-triacontyl n-dodecylmethylamine, n-octyldimethylamine, n-decyldiethylamine n-dodecyldiethylamine, n-octadecyldimethylamine, n-eicosyl dimethylamine, n-octyl n-dodecylmethylamine, n-decyl n-eicosylethylamine, n-octyldimethylamine, n-decyldimethylamine, n-dodecyldimethylamine, n-tetradecyldimethylamine, n-hexadecyldimethylamine, n-octadecyldimethylamine, n-eicosyldimethylamine, di-(n-octyl)methylamine, di-(n-decyl)methylamine, di-(n-dodecyl)methylamine, di-(n-tetradecyl)methylamine, di-(n-hexadecyl)methylamine, di-(n-octadecyl)methylamine, di-(n-eicosyl)methylamine, n-octyl n-dodecylmethylamine, n-decyl n-octadecylmethylamine, dimethylbenzylamine, N,N-dimethylaniline, N,N-dimethylaniline, N-methyldiphenylamine, triphenylamine, N-methyl-N-dodecylaniline pyridine, 2-methylpyridine, triethanolamine, N-methylmorpholine, N-methylpiperidine, N-ethylpiperidine, N,N-dimethylpiperazine, 1-methyl imidazole, 1-butylimidazole, 1,8-diazabicyclo[5.4.0]undec-7-ene, 1,5-diazabicyclo[5.4.0]undec-5-ene, 1,5-diazabicyclo[4.3.0]non-5-ene, 1,4-diazobicyclo[2.2.2]-octane, tetramethyl guanidine, N,N,N',N'-tetramethyl-1,8-diaminonaphthalene, 2-phenyl-2-imidazoline, 2-ethylimidazole, bis(2-ethylhexyl)amine, etc;

(2) metal salts or complexes,—examples include but are not limited to, chromium (III) tris(acetylacetonate), chromium (III) 2-ethylhexanoate, AFC Accelerator AMC-2 (a solution of chromium (III) complex purchased from Ampac Fine Chemical LLC), chromium (III) hexanoate, chromium (III) octoate, chromium (III) stearate, chromium (III) naphthenate, 3,5-diisopropylsalicylato chromium (III) chelate, bis(3,5-diisopropylsalicylato)-monohydroxy chromium (III) chelate, zinc acetate, zinc acetate dihydrate, zinc acetylacetonate, zinc octoate, zinc laurate, zinc salicylate, zinc glycinate, zinc gluconate, zinc oleoylsarcosinoate, zinc naphthenate, zinc 2-ethylhexyl acid phosphate salt, zinc butyl acid phosphate salt, zinc di-2-ethylhexyldithio-phosphate, zinc salt of dodecenyl succinate butyl half ester, N-butylsalicylaldimio zinc (II) chelate, zinc isovalerate, zinc succinate, zinc dibutyl dithiocarbamate, stannous octoate, stannum (II) 2-ethylhexyl acid phosphate salt, titanium ethyl acetoacetate chelate, titanium acetoacetate chelate, titanium triethanolamine chelate, zirconium octoate, zirconium 6-methylhexanedione, zirconium (IV) trifluoroacetylacetone, 3,5-diisopropylsalicylato nickel (II) chelate, nickel acetylacetonate, N-butylsalicylaldimio nickel (II) chelate, 3,5-diisopropylsalicylato manganese (II) chelate, manganese naphthenate, manganese naphthenate, magnesium 2,4-pentadionate, iron octoate, ferric linoleate, iron (III) acetylacetonate, cobalt octoate, cobalt naphthenate, cobalt (III) acetylacetonate, N-butylsalicylaldimio cobalt (II) chelate, N-butylsalicylaldimio cobalt (III) chelate, 3,5-diisopropylsalicylato cobalt (II) chelate, N-butylsalicylaldimio copper (II) chelate, 3,5-diisopropylsalicylato copper (II) chelate, 3,5-diisopropylsalicylato oxyvanadium (IV) chelate, aluminum acetylacetonate, aluminum lactate, dibutyltin dilaurate, dibutyltin oxide, butylchloro tin dihydroxide, cerium naphthenate, calcium octoate, bismuth octoate, lithium acetate, sodium acetate, potassium acetate, etc;

(3) quaternary ammonium compounds,—examples include but are not limited to, tetrabutyl ammonium bromide, tetrabutyl ammonium iodide, tetrabutyl ammonium hydrogen sulphate, tetrabutyl ammonium fluoride, tetrabutyl ammonium chloride, tetraethyl ammonium bromide, tetraethylammonium iodide, tetrapropylammonium bromide, tetrapropyl ammonium iodide, tetramethyl ammonium chloride, tetramethylammonium bromide, tetramethyl ammonium iodide, tetraoctyl ammonium bromide, benzyltriethyl ammonium chloride, benzyltributyl ammonium chloride, benzyltrimethyl ammonium chloride, benzyltrimethylammonium bromide, butyltriethyl ammonium bromide, methyltrioctyl ammonium chloride, methyltricapryl ammonium chloride, methyltributyl ammonium chloride, methyltributyl ammonium bromide, methyltriethyl ammonium chloride, myristyltrimethyl ammonium bromide, tetradecyltrimethyl ammonium bromide, cetyltrimethyl (or hexadecyltrimethyl) ammonium bromide, hexadecyltrimethyl ammonium bromide, cetyltrimethylammonium chloride, hexadectyltrimethyl ammonium chloride, lauryltrimethyl ammonium chloride, dodecyltrimethyl ammonium chloride, phenyltrimethyl ammonium chloride, benzalkonium chloride, cetyldimethylbenzyl ammonium bromide, cetalkonium bromide, cetyldimethylbenzyl ammonium chloride, cetalkonium chloride, tetrabutyl ammonium perchlorate, tetrabutyl ammonium p-toluene sulfonate, tetraethyl ammonium p-toluene sulfonate, cetyltrimethyl ammonium p-toluene sulfonate, tetraethyl ammonium tosylate, tetrabutyl ammonium tosylate, cetyltrimethyl ammonium tosylate, phenyltrimethyl ammonium bromide, benzyltrimethyl ammonium hydroxide, tetrabutyl ammonium hydroxide, tetramethyl ammonium hydroxide, etc;

(4) quaternary phosphonium compounds,—examples include but are not limited to, tetrabutyl phosphonium bromide, ethyltriphenyl phosphonium iodide, ethyltriphenyl phosphonium bromide, ethyltriphenyl phosphonium iodide, butyltriphenyl phosphonium bromide, benzyltriphenyl phosphonium chloride, methyltriphenyl phosphonium bromide, methyltriphenyl phosphonium iodide, tetraphenyl phosphonium bromide, triphenyl phosphonium bromide, methyltriphenyl phosphonium chloride, butyl triphenyl phosphonium chloride, (methoxy methyl)triphenyl phosphonium chloride, etc;

(5) phosphines, such as triphenylphosphine, etc;

(6) alkali metal hydroxide, e.g. potassium hydroxide, sodium hydroxide, etc.

The catalyst may be added at any point during the prepolymerization from the initial charge until the coating of the reaction mixtures. In certain embodiments, it is important that the catalyst be added when the catalyst can be homogeneously distributed.

The PSA compositions may also include additives and fillers. Fillers may either originally occur in the starting materials such as esters of fatty acids, or be included on purpose. Additives such as tackifiers, colored pigments, opacifiers, processing oil plasticizers, solvents and other constituents known to the tape art may be incorporated in the PSAs.

In certain embodiment, the polyester condensation product disclosed herein is the majority component of the pressure sensitive adhesive composition meaning the pressure sensitive adhesive composition includes at least about 50, particularly at least about 70, more particularly at least about 80, and most particularly at least about 90, weight percent of the polyester condensation product based on the total weight of the pressure sensitive adhesive composition.

The pre-polymerization of EVO with a dimer acid or anhydride thereof, a trimer acid or anhydride thereof, a polymerized fatty acid or anhydride thereof, a carboxylic acid-capped prepolymer or oligomer, or a mixture thereof may be accomplished by heating a reaction mixture of EVO and a dimer acid or anhydride thereof, a trimer acid or anhydride thereof, a polymerized fatty acid or anhydride thereof, a carboxylic acid-capped prepolymer or oligomer, or a mixture thereof, and optionally a monobasic acid or its anhydride derivative, under controlled conditions (especially reaction temperature and time), to a degree that cross-linking does not obviously occur, and the viscosity of the intermediate reaction mixture is appropriate to allow blade-coating. If desired, the reaction is preferably carried out under an inert atmosphere free from oxygen, e.g. under nitrogen, since the esters are easily oxidized at high temperature to give dark-colored products. The polymerization compositions can be considered as a two-part system in which the EVO component (either unmodified or modified with a monobasic acid) comprises one part (component (i)), a dimer acid or anhydride thereof, a trimer acid or anhydride thereof, a polymerized fatty acid or anhydride thereof, and/or a carboxylic acid-capped prepolymer or oligomer (and optionally at least one monobasic acid) comprises the second part (component (ii)). The two parts can be mixed together in three methods: (1) the two parts are mixed together at room temperature prior to heating; (2) component (i) in melt or liquid state is mixed together with component (ii) in solid state at room temperature, prior to heating together; (3) both component (i) and (ii) are in melt or liquid state, prior to mixing and heating.

In some particular embodiments, prior to the polymerization with the EVO component (either unmodified or optionally modified with a monobasic acid), the dibasic acid is initially pre-polymerized with a diepoxy (glycidyl or epoxidized compounds having at least two epoxy groups), diols or polyols, diamines, etc. to give prepolymers or oligomers capped with carboxylic acid groups at both chain ends, or branched or hyperbranched polymers or oligomers with at least two of the branches and chain ends capped with carboxylic acid groups (described previously), at a temperature suitably in the range from 20 to 300° C. for 1 to 300 minutes, preferably from 60 to 220° C. for 3 to 240 minutes, and more particularly from 80 to 180° C. for 5 to 120 minutes. In the pre-polymerization reaction, the molar ratio of carboxylic acid groups in the dibasic acid to glycidyl, oxirane, hydroxyl, or amine groups (in the cases of diglycidyl ethers, epoxidized compounds, diols, or diamines, respectively) can be important, since the molar ratio governs the nature of the terminal units, molecular weight and viscosity of the resulting pre-polymers. The molar ratio should be greater than one to ensure that the resulting pre-polymers are capped with carboxylic acid groups at both chain ends; but it is no less than 1.0001, preferably from 1.005 to 100, more particularly from 1.02 to 20, so as to help control the molecular weight and viscosity of the resulting prepolymers. For example, the molecular weight (number average molecular weight) should be no higher than 100,000, preferably no higher than 50,000, more particularly no higher than 20,000; the viscosity should be no higher than 1,000,000, preferably no higher than 100,000, more particularly no higher than 50,000, at operating temperatures and stirring speeds. Catalysts used to effectively catalyze the reaction between carboxylic acid groups or anhydride groups and epoxy groups (which are described above) can also be employed to increase the pre-polymerization rate. The amount of the catalysts used can be from about 0.05 to 10.0 parts by weight, more particularly 0.1 to 10.0, preferably from about 0.2 to 5 parts by weight, based on the total weight of the reactants.

According to particular embodiments, the novel EVO-based PSA compositions may be prepared by heating the reaction mixture at a temperature suitably in the range from 30 to 300° C. for 1 to 120 minutes, preferably from 60 to 220° C. for 3 to 60 minutes, and more particularly from 80 to 180° C. for 4 to 30 minutes. Several embodiments of reaction mixtures (catalysts may be optionally included in the mixtures) are listed below:

(i) unmodified EVO and dimer acid or anhydride thereof;
(ii) EVO (previously modified with monobasic acid or anhydride) and dimer acid or anhydride thereof;
(iii) unmodified EVO and trimer acid or anhydride thereof;

(iv) EVO (previously modified with monobasic acid or anhydride) and trimer acid or anhydride thereof;
(v) unmodified EVO and polymerized fatty acid or anhydride thereof;
(vi) EVO (previously modified with monobasic acid or anhydride) and polymerized fatty acid or anhydride thereof;
(vii) unmodified EVO and a mixture of monomer (unsaturated fatty acid), dimer acid, trimer acid and/or polymerized fatty acid; said monomer is an unsaturated fatty acid used to prepare the above mixture, and can be considered as a monobasic acid used to modified EVO;
(viii) EVO (previously modified with monobasic acid or anhydride) and a mixture of monomer (unsaturated fatty acid), dimer acid, trimer acid and/or polymerized fatty acid; said monomer is an unsaturated fatty acid used to prepare the above mixture, and can be considered as a monobasic acid used to modified EVO;
(ix) unmodified EVO and carboxylic acid-capped dimer acid prepolymer or oligomer;
(x) EVO (previously modified with monobasic acid or anhydride) and carboxyl acid-capped dimer acid prepolymer or oligomer;
(xi) EVO, monobasic acid or anhydride, and dimer acid or anhydride thereof;
(xii) EVO, monobasic acid or anhydride, and trimer acid or anhydride thereof; and
(xiii) EVO, monobasic acid or anhydride, and polymerized fatty acid or anhydride thereof.

In certain embodiments, the only PSA-forming reactive components of the final reaction mixture are (i) the EVO (modified or unmodified), and (ii) the dimer acid or anhydride thereof, trimer acid or anhydride thereof, polymerized fatty acid or anhydride thereof, or a mixture thereof. In further embodiments, the only polymeric-forming reactive components of the final reaction mixture are (i) the EVO (modified or unmodified), and (ii) the carboxylic acid-capped dibasic acid prepolymer or oligomer.

The compositions may have an open time of up to about 5 or 120 minutes, depending on the nature of the dibasic acids, the functionality of EVO, mixing methods, reaction temperature, and the nature and amount of catalysts (as described above). As used herein, "open time" denotes the time from mixing of the two parts to the time at which cross-linking takes place to a point that the mixed composition can no longer be applied. Generally, the higher the reaction temperature, the shorter the open time. At lower temperature, the carboxylic acid groups are mainly consumed by epoxy groups. But at higher temperature, both epoxy groups and hydroxyl groups derived from carboxyl-epoxy reaction may react with carboxylic acid groups. As the reaction proceeds further, the carboxylic acid-hydroxyl esterification reaction dominates the reaction, with the result that the density of cross-linking increases and the mixed composition becomes more difficult for coating and less appropriate for PSAs. The reaction can be controlled to generate coatings with low glass transition temperature, sufficient cohesive strength, and good initial tack and adhesive powder which are appropriate for PSA.

In typical EVO-based PSA compositions disclosed herein, dimer acid or anhydride thereof, trimer acid or anhydride thereof, polymerized fatty acid or anhydride thereof, and/or carboxylic acid-capped prepolymers or oligomers can be used in molar ratios of carboxylic acid groups to EVO (or modified EVO) epoxy groups of from about 3:1 to about 1:3, preferably from 2:1 to 1:1.8, more particularly from 1.2:1 to 1:1.1.

In certain embodiments, an initial or first-stage polymerization is accomplished by heating the reaction mixture only to the extent that cross-linking does not obviously occur, and the viscosity of the first-stage reaction mixture is sufficiently low to allow blade-coating of the reaction mixture onto PSA backing materials or release liners (e.g., siliconized release liners). For example, the viscosity should be no higher than 2,000,000 mPa·s, preferably no higher than 200,000 mPa·s, more particularly no higher than 100,000 mPa·s, at operating temperatures and stirring speeds. The PSA backing materials can be paper, cellophane, plastic film, cloth, tape or metal foils.

The resulting prepolymer coatings on the backings are then heated such as in an air-circulating oven, infrared furnace so that appropriate cross-linking of the polyesters can take place to give a "dry" adhesive layer of sufficient cohesion strength, good initial tack and adhesive power that are appropriate for PSA applications.

According to particular embodiments, the homogenous mixtures can be blade-coated within the open time on PSA backing substrates (such as paper and PET film) or siliconized release liners with a glass bar immediately after heating of the mixed compositions, with the result that a thin, uniform layer of the mixed compositions is produced on the backing or liner at a coating level of about 2 to about 10 mg/cm$^2$. It should be noted herein that, the "monomer" reaction mixtures (e.g., EVO and dimer acid) per se are generally of low viscosity, and may be too low in fact to be handled conveniently. In order to increase their viscosity to a more desirable level, the "monomer" reaction mixtures are partially polymerized prior to coating to a desirable degree such that a fairly high conversion of the dibasic acid is reached but cross-linking does not obviously occur, thus forming a clear "syrup" of appropriate viscosity.

According to some particular embodiments, the resulting adhesive coatings on the PSA backings are then subjected to heat such as in an air-circulating oven maintained at 100-300° C. for 10 seconds to 100 minutes, preferably at 120-250° C. for 30 seconds to 80 minutes, and more particularly at 150-200° C. for 1 to 60 minutes, so that appropriate cross-linking of the polyesters can take place to give a "dry" adhesive layer of sufficient cohesion strength, good initial tack at room temperature and adhesive strength that are appropriate for PSAs. Generally, the higher the reaction temperature the shorter the duration of heating is needed to accomplish the polymerization to an ideal degree. However, before choosing the oven temperature, the heat stability of the PSA backing or siliconized release liners should be considered.

Although not bound by any theory, it is assumed that, due to the action of heat, the reactive groups (carboxylic acid groups, and epoxy groups and/or hydroxyl groups) which are still present in the pre-polymers on the PSA backing, are activated to such an extent that they are capable of further polymerization and cross-linking. For PSA applications, cross-linking is desirable, particularly where it is desired to increase the cohesive strength of the adhesive without unduly affecting its compliance. However, too high density of cross-linking can be deleterious to the PSA properties, with a severe loss of compliance as reflected in the peel test. Therefore, the reaction temperature and time at this stage may be finely tuned for appropriate cross-linking of the PSA systems.

Also disclosed herein are new PSA compositions based on modified EVOs, and methods for the preparation of said PSA formulations and PSA tapes and/or foils thereof. In this embodiment, the PSA compositions include a polyester condensation product prepared at elevated temperatures of modified EVO and at least one dimer acid, trimer acid, and/or polymerized fatty acid, wherein the modified EVO was made by reacting at least one EVO and at least one monobasic acid or its anhydride derivative at elevated temperatures. It should be noted herein that, such modification at the same time increases the hydrophilicity of EVO due to introduction of hydroxyl groups, which facilitates the reaction between EVO and dibasic acids, and improves coating "wet-out" of the reaction mixture to tape backings such as paper.

The novel EVO-based PSAs may be prepared by mixing (by any mixing methods described above) and heating modified EVO and at least one dimer acid or anhydride thereof, trimer acid or anhydride thereof, polymerized fatty acid or anhydride thereof, or a carboxylic acid-capped prepolymer or oligomer (and optionally a monobasic acid or its anhydride derivative). Modified EVO is previously prepared by reacting EVO with at least one monobasic acid or its anhydride derivatives, and catalysts (as described above) if needed, at a temperature suitably in the range from 80 to 300° C. for 10 seconds to 300 minutes, preferably from 100 to 220° C. for 30 seconds to 200 minutes, more particularly from 120 to 180° C. for 1 to 120 minutes. Generally, at this stage of modification of EVO, no cross-linking reaction occurs, regardless of the reaction temperature and reaction time. The higher the reaction temperature, the shorter the duration of heating needed to accomplish the modification. At a lower temperature, the carboxylic acid groups are mainly consumed by epoxy groups, but at higher temperature, hydroxyl groups derived from carboxylic acid-epoxy reaction may react with carboxylic acid groups. According to particular embodiments, the amount of monobasic acid used in the present PSA compositions to react with EVO is preferably such as to leave about 1.5 to about 6 moles, more preferably about 2 to about 5 moles, more particularly about 2.5 to about 4.5 moles of epoxy groups, in one mole of modified EVO.

The modified EVO so formed is then further mixed (by any mixing methods described above) and reacted with at least one dimer acid or anhydride thereof, trimer acid or anhydride thereof, and/or polymerized fatty acid or anhydride thereof, or a combination of dimer acid, trimer acid, and/or polymerized fatty acid, or prepolymers or oligomers capped with carboxylic acid groups at both chain ends, or branched or hyperbranched polymers or oligomers with at least two or all of the branches and chain ends capped with carboxylic acid groups (described previously), and optionally a monobasic acid or its anhydride derivative, and catalysts (as described above) if needed, at a temperature suitably in the range from 30 to 300° C. for 10 seconds to 120 minutes, preferably from 60 to 220° C. for 30 seconds to 60 minutes, and more particularly from 80 to 180° C. for 1 to 30 minutes. The mixed compositions may have an open time of up to about 10 or 120 minutes, depending on the nature of dibasic acid, functionality of the modified EVO, mixing method, reaction temperature, and the nature and amount of catalysts (as described above).

According to particular embodiments, the homogenous mixtures can be blade-coated within the open time on PSA backing substrates (such as paper and PET film) or siliconized release liners with a glass bar immediately after heating of the mixed compositions, with the result that a thin, uniform layer of the mixed compositions is produced on the backing or liner at a coating level of about 2 to about 10 mg/cm$^2$. The resulting adhesive coatings on the PSA backings are then subjected to heat such as in an air-circulating oven maintained at 100-300° C. for 10 seconds to 100 minutes, preferably at 120-250° C. for 30 seconds to 80 minutes, and more particularly at 150-200° C. for 1 to 60 minutes, so that appropriate cross-linking of the polyesters can take place to give a "dry" adhesive layer of sufficient cohesion strength, good initial tack and adhesive power that are appropriate for PSAs. Generally, the higher the reaction temperature the shorter the duration of heating is needed to accomplish the polymerization to an ideal degree. However, before choosing the oven temperature, the heat stability of the PSA backing or siliconized release liners should be considered.

The PSA composition coatings on the release liners can also be covered with a sheet of backing material, resulting in a sandwich assembly which is then pressed (e.g., with a rubber roller) to achieve sufficient wet-out of the adhesive onto the PSA backing. Subsequently, the release liner is removed from the sandwich assembly, with the adhesive transferring onto the PSA backing. The resulting adhesive coatings on the backing are then heated such as in an air-circulating oven so that appropriate cross-linking of the polyesters can take place to give a dry adhesive layer of sufficient cohesion strength, good initial tack and adhesive power that are appropriate for PSA.

It should be noted that, the coating composition layer on the backing substrate after heating might not have a good appearance, with blotches of no or little adhesive on the PSA backing, probably due to retraction of the adhesive during polymerization and cross-linking. To address this issue, a novel technology, viz. a "thin-layer reactor" was developed and applied to the PSA systems. i.e., the adhesive composition is initially blade-coated on the siliconized face of siliconized release liners; the resulting adhesive coatings on the siliconized release liners are then covered with a sheet of PSA backing material or another sheet of release liner, resulting in the sandwich assembly functioning as "thin-layer reactor."

In some particular embodiments, the sandwich assembly consisting of a release liner and the backing material as a whole may be heated to cure the PSA composition and then the release liner may be removed. In other particular embodiments, the preparation of a PSA composition, PSA tapes or other PSA products comprising the composition could be performed with the aid of two siliconized release liners with different adhesion-repellence abilities to the adhesive composition. The reaction mixture immediately after the pre-polymerization is initially blade-coated on the siliconized face of a sheet of partially siliconized release liner; the resulting adhesive coating is then covered with a sheet of fully siliconized release liner (with the siliconized face inwardly), resulting in a sandwich assembly which is pressed (e.g., with a rubber roller) to achieve a good contact between the adhesive composition and the two liners. A "partially" siliconized release liner means that the release liner surface is partially covered by a silicone agent; a "fully" siliconized release liner means that the release liner surface is substantially covered by a silicone agent, leading to better adhesion-repellence ability to the adhesive composition than "partially" siliconized release liner. The sandwich assembly is then heated such as in an air-circulating oven so that appropriate cross-linking of the polymers can take place to give a dry adhesive layer of sufficient cohesion strength, good initial tack and adhesive power that are appropriate for PSA application. Afterwards, the fully siliconized release liner is quickly peeled off without taking away any adhesive composition, thereupon a sheet of backing material such as paper, bi-axially oriented polypropylene (BOPP) film, or PVC film is immediately and carefully covered on the adhesive layer. The new "sandwich" is then pressed (e.g., with a rubber roller) to achieve sufficient wet-out of the adhesive onto the backing material in order to provide adequate adhesion. After the sandwich assembly is cooled down, the partially siliconized release liner could be easily peeled off with the adhesive composition completely transferring to the backing material. In these embodiments, a first release liner, e.g., the partially siliconized release liner has an adhesion-repellence to the final adhesive composition less than that of a second release liner, e.g., the fully siliconized release liner. In other words, the second release liner can be more easily removed than the first release liner meaning that one release liner can be removed while the PSA composition still adheres to another release liner. The siliconized released liner can be optionally left for protection of the adhesive layers on the backing material. Advantages for this technology include without limitation, (1) shrinkage of the PSA composition can be considerably avoided, (2) low molecular weight starting materials for making the PSA composition are avoided to penetrate the paper backing to give oily or dirty appearance of the resulting PSA tape, and (3) in the cases that materials of low Heat Distortion Temperature and/or inferior thermal stability (such as PP and PVC) are used as PSA backing materials, subjection to oven heating at high temperatures (e.g., 160° C.) can be avoided.

According to particular embodiments, the present PSAs may be used to manufacture many different types of PSA tapes. Thus, various flexible tape backings and liners may be used, including films (transparent and non-transparent), plastics such as PET, BOPP and PVC film or modified natural substances such as cellophane, cloths, papers, non-woven fibrous constructions, metal foils, metalized plastics foils, aligned filaments, etc.

The adhesive layers can be covered with papers or films which contain an adhesive-repellent layer, e.g. a separating layer consisting of silicone, for the protection of the adhesive layers on the PSA backings. The back side of the PSA films, tapes or foils can be coated with an adhesive-repellent coating (e.g. silicone coating) for facilitating rolling off the PSA.

In still another embodiment, the preparation of the PSA and PSA tapes thereof as disclosed herein could be continuously performed using a combination of reactive extrusion and reactive calendaring, which is illustrated in FIG. 1. The reactive calendaring setup is a device that includes a series of rollers placed in an oven chamber. In one embodiment, the rollers may be unheated and disposed of inside an oven chamber at a preset temperature. In another embodiment, heated rollers can be used and the whole calendaring setup does not need to be housed in an oven chamber.

As shown in FIG. 1, the prepolymerization is done continuously using reactive extrusion in a mono- or twin-screw extruder. The hot prepolymer from the extruder is thereupon coated on a backing material (such as film or paper, et al) or a release liner, which is then laminated with another release liner with different adhesion abilities to the adhesive composition, to give a sandwich assembly. Afterwards, the sandwich assembly is directed to heated calendar rollers or calendar rolls placed in an oven chamber at a preset temperature. The duration of the process can be fine-tuned by adjusting the number and sizes of the rolls or the travel distance of the assembly inside the oven chamber, so that appropriate cross-linking of the polyesters can take place to give a dry adhesive layer of sufficient cohesion strength, good initial tack and adhesive power that are appropriate for PSA.

The vegetable oil-based PSA compositions and the method of making them are attractive from both the commercial and environmental perspectives. The advantages of these novel PSAs include without limitation:

(1) the starting materials can all be derived from naturally abundant and renewable resources, providing an alternative to petrochemical-based PSAs;

(2) the products are biodegradable, thus alleviating environmental pollution by used PSA-containing products;

(3) The composition is relatively simple and all ingredients are inexpensive, non-toxic and environmentally friendly. Additives that are commonly used in many petrochemical-based PSAs such as tackifiers and waxes may not be needed; and (4) The processes of making the PSAs are short and simple, thus facilitating a large scale production with low energy consumption. PSAs can be made without use of any organic solvent or hazardous expensive catalysts. The whole processes are very environmentally friendly.

Example 1

This example describes the preparation of a PSA composition from ESO (epoxy equivalent weight~229) and dimer acid (hydrogenated; available from Aldrich; average $M_n$~570, dimer acid≥98%, monomer≤1%, trimer acid≤1%) in a molar ratio of 1:1.16 oxirane groups to carboxylic acid groups in the presence of chromium (III) tris(acetylacetonate) (0.92 wt % based on the weight of the reaction mixture), and of PSA tapes comprising the composition with the aid of two siliconized release liners with different adhesion-repellence properties for the adhesive composition.

Chromium (III) tris(acetylacetonate) (0.090 g) and dimer acid (5.76 g, containing 20.2 mmol of carboxylic acid groups) were charged to a 50-mL, round-bottom flask equipped with a silicon oil bath and magnetic stirrer, and heated up to 100° C. by the preheated oil bath with stirring to give a clear, pale purple, viscous solution. To the flask, ESO (3.98 g, containing about 17.4 mmol of oxirane groups) was then added, and the resulting mixture was bubbled with nitrogen for two minutes. Afterwards, heating and stirring (500 rpm) were continued for 20 minutes at the same temperature to give an initial-stage ($1^{st}$ stage) polymer that is a clear, pale purple, viscous "syrup". The flask was then taken out of the oil bath, and the initial-stage polymer syrup was quickly blade-coated on the siliconised face of a sheet of partially siliconized release liner with a glass rod at a coating level of about 7 mg/cm$^2$, to give a thin, uniform layer of sticky, fiber-forming and "wet" coating layer. The adhesive layer was then carefully covered (the siliconized face inwardly) with a sheet of fully siliconized release liner, resulting in a "sandwich" which was then pressed with a rubber roller to achieve a good contact between the adhesive composition and the two liners. Subsequently, the "sandwich" was placed in an air-circulating oven maintained at 160° C. The heat caused the cross-linking reaction of the coating composition. The "sandwich" was taken out of the oven after 15 minutes in the oven. The fully siliconized released liner was peeled off without taking away any adhesive composition; a sheet of paper was immediately and carefully covered on the adhesive layer. The new "sandwich" was then pressed with a rubber roller to achieve sufficient wet-out of the adhesive onto the paper backing in order to provide adequate adhesion. After the "sandwich" was cooled down, the partially siliconized release liner could be peeled off with the adhesive composition being completely transferred to the paper backing. The siliconized release liner can be optionally left for the protection of the adhesive layers on the paper backing or be recovered for re-use. The adhesive coating on the paper backing was a thin, clear, pale purple, shiny, uniform, "dry" adhesive layer of sufficient cohesion strength, and was not found to penetrate the paper backing to give an oily appearance of the PSA tape. The finished PSA tape thus obtained possessed good initial tack, formed ropy structure upon removal of it from surfaces (e.g. metal, lacquer, glass, human skin) to which they are applied, and exhibited a good adhesive power of about 1.8 lbf/inch on stainless steel (type 316). The 90° peel adhesion test method and conditions are described below; the sample was cleanly removed in the test, leaving no adhesive residue on the panel. The experimental conditions and 90° peel adhesion test results are shown in Table 1.

This following procedure describes 90° peel adhesion test on stainless steel for all of the sample tapes. The measure of bond strength between an adhesive and a substrate is defined as adhesion, which is typically obtained using the 90° peel adhesion test method by measuring the force required to remove the pressure-sensitive material from a stainless steel, at an angle of 90°, and at a specified speed of 12 inches/minute, according to ASTM D3330/D3330M-04 (2010). The tests are performed on an Instron 5582 testing machine at 23±1° C. and 50±5% RH. An exemplary 90° peel adhesion test of sample tapes on a stainless steel test panel (type 302 stainless steel, 2 by 5 inches) consists of following steps:

(1) Clean the test panel three times with acetone and Kimwipe-Clark wipers, and condition the panel for about 10-12 minutes before applying the tape onto the panel.
(2) Randomly cut 5 strips of specimens from each PSA-coated sample sheet. The size of the specimens is 1 by 12 inches.
(3) Fold approximately 0.5 inch at one end of the specimen, adhesive to adhesive to form a tab. Touch other end of the specimen to an end of the test panel, with the adhesive side down against the stainless steel test panel. Hold the folded end of the specimen so that it does not make contact with the panel but is positioned loosely above it. Press the specimen by two passes of a 4.5-pound hard rubber roller in the direction parallel to the panel length, to achieve sufficient wet-out onto the panel surface in order to provide adequate adhesion.
(4) The pasted specimen tape was allowed to dwell for 1 minute prior to testing.
(5) Set up and calibrate the testing machine in accordance with the manufacture instructions. A five-pound load cell was used.
(6) Double back the folded end of the specimen tape at a 90° angle and peel 1 inch of it from the panel. Place the folded end of the specimen onto the upper jaw of the testing machine, and start testing. The speed of the moving jaw for the peel test was 12 inches/minute. While the upper jaw was moving up, the panel was passively moved in the horizontal direction along the holder so that the specimen tape maintained a peel angle of 90° throughout the test.
(7) Data were collected after the first inch of specimen tape was peeled, and average peel adhesion strength in pounds was obtained for peeling the rest of the tape.
(8) Repeat the above steps to test the other four strips of specimen, and average the results.

TABLE 1[a]

| Examples[b] | 1$^{st}$ stage of pre-polymerization acid, epoxide; oxirane/COOH | temp. (° C.) | time (min) | 2$^{nd}$ stage of pre-polymerization ESO, molar ratio[c] | temp. (° C.) | time (min) | Catalyst (phr) | Cure time[d] (min) | Peel strength[e] (lbf/inch) |
|---|---|---|---|---|---|---|---|---|---|
| 1 | DA, ESO 0.86 | 100 | 20 | | | | Cr-TAA 0.92 | 15 | 1.8 |
| 2 | DA, ESO 0.95 | 80 | 25 | | | | AMC-2 0.88 | 15 | 1.7 |
| 3 | DA, ESO 0.95 | 80 | 40 | | | | AMC-2 1.00 | 9 | 1.0 |
| 4 | DA, ESO 0.95 | 80 | 87 | | | | AMC-2 1.00 | 12 | 0.9 |
| 5 | DA, ESO 1.01 | 80 | 25 | | | | AMC-2 1.90 | 3.5 | 1.2 |
| 6 | DA, ESO 1.01 | 80 | 50 | | | | AMC-2 1.06 | 8 | 1.3 |
| 7 | DA, BPAGE 0.370 | 80 | 120 | ESO 0.527 | 80 | 15 | AMC-2 0.93 | 10 | 3.2 |
| 8[f] | DA, BPAGE 0.383 | 150 | 80 | ESO 0.551 | 80 | 43 | AMC-2 0.93 | 13 | 1.8 |
| 9 | DA, BPAGE 0.383 | 150 | 80 | ESO 0.551 | 80 | 15 | AMC-2 0.93 | 12 | 2.0 |
| 10 | SA, BPAGE 0.372 | 150 | 60 | ESO 0.520 | 150 | 3 | AMC-2 1.00 | 5 | 2.1 |

[a]abbreviations: ESO, epoxidized soybean oil (epoxy equivalent weight ~229); phr, parts per hundred parts by weight of resin; DA, dimer acid (hydrogenated; available from Aldrich; average $M_n$ ~570, dimer acid ≥98%, monomer ≤1%, trimer acid ≤1%); Cr-TAA, chromium (III) tris(acetylacetonate) (Aldrich, 97%); AMC-2, AFC Accelerator AMC-2 (a 50 wt % solution of chromium (III) complex, available from Ampac Fine Chemical, LLC); BPAGE, bisphenol A diglycidyl ether (epoxy equivalent weight ~173); SA, sebacic acid (98% purity).
[b]PSA backing materials are paper, except that bi-axially oriented polypropylene film is used as backing material in Examples 3 and 8, and that PVC film is used as backing material in Examples 4 and 9.
[c]molar ratio of oxirane group from ESO to carboxylic acid group from dibasic acid.
[d]the time of the cure reaction in the air-circulating oven at 160° C., except that the reaction for Example 5 took place in the oven at 170° C.
[e]the 90° peel adhesion test method, procedure and conditions are described in Example 1; the sample adhesives were cleanly removed in the test, leaving no adhesive residue on the panel.

f: the shear time to failure tests were also performed at 23° C. on a stainless steel (type 302) substrate in accordance with ASTM D3654/D3654M-06 (2006), using a 1000 gram test mass and 1 inch times 1 inch testing area. And a shear time to failure of >25 days was recorded.

Example 2

This example describes the preparation of a PSA composition from ESO (epoxy equivalent weight~229) and dimer acid (hydrogenated; available from Aldrich; average $M_n$~570, dimer acid≥98%, monomer≤1%, trimer acid≤1%) in a molar ratio of 1:1.05 oxirane groups to carboxylic acid groups in the presence of AFC Accelerator AMC-2 (0.88 wt % based on the weight of the reaction mixture), and of PSA tapes comprising the composition with the aid of two siliconized release liners with different adhesion-repellence properties for the adhesive composition.

AMC-2 (0.076 g) and dimer acid (4.86 g, containing 17.1 mmol of carboxylic acid groups) was charged to a 50-mL, round-bottom flask equipped with a silicon oil bath and magnetic stirrer, and heated up to 80° C. by the preheated oil bath with stirring to give a clear, pale green, viscous solution. To the flask, ESO (3.72 g, containing about 16.3 mmol of oxirane groups) was then added, and the resulting mixture was bubbled with nitrogen for two minutes. Afterwards, heating and stirring (500 rpm) were continued for 25 minutes at the same temperature to give an initial-stage polymer that is a clear, pale green, viscous "syrup". The flask was then taken out of the oil bath, and the initial-stage polymer syrup was quickly blade-coated on the siliconised face of a sheet of partially siliconized release liner with a glass rod at a coating level of about 7 mg/cm$^2$, to give a thin, uniform layer of sticky, fiber-forming and "wet" coating layer. The adhesive layer was then carefully covered (the siliconized face inwardly) with a sheet of fully siliconized release liner, resulting in a "sandwich" which was then pressed with a rubber roller to achieve a good contact between the adhesive composition and the two liners. Subsequently, the "sandwich" was placed in an air-circulating oven maintained at 160° C. The heat caused the cross-linking reaction of the coating composition. The "sandwich" was taken out of the oven after 15 minutes in the oven. The fully siliconized released liner was peeled off without taking away any adhesive composition; a sheet of paper was immediately and carefully covered on the adhesive layer. The new "sandwich" was then pressed with a rubber roller to achieve sufficient wet-out of the adhesive onto the paper backing in order to provide adequate adhesion. After the "sandwich" was cooled down, the partially siliconized release liner could be peeled off with the adhesive composition being completely transferred to the paper backing. The siliconized release liner can be optionally left for the protection of the adhesive layers on the paper backing or be recovered for re-use. The adhesive coating on the paper backing was a thin, clear, pale yellowish green, shiny, uniform, "dry" adhesive layer of sufficient cohesion strength, and was not found to penetrate the paper backing to give an oily appearance of the PSA tape. The finished PSA tape thus obtained possessed good initial tack, formed ropy structure upon removal of it from surfaces (e.g. metal, lacquer, glass, human skin) to which they are applied, and exhibited a good adhesive power of about 1.7 lbf/inch on stainless steel (type 316). The 90° peel adhesion test method and conditions are described in Example 1; the sample was cleanly removed in the test, leaving no adhesive residue on the panel. The experimental conditions and 90° peel adhesion test results are shown in Table 1.

Example 3

This example describes the preparation of a PSA composition from ESO (epoxy equivalent weight~229) and dimer acid (hydrogenated; available from Aldrich; average $M_n$~570, dimer acid≥98%, monomer≤1%, trimer acid≤1%) in a molar ratio of 1:1.05 oxirane groups to carboxylic acid groups in the presence of AFC Accelerator AMC-2 (1.00 wt % based on the weight of the reaction mixture), and of PSA tapes (BOPP film as backing material) comprising the composition with the aid of two siliconized release liners with different adhesion-repellence properties for the adhesive composition.

AMC-2 (0.067 g) and dimer acid (3.78 g, containing 13.3 mmol of carboxylic acid groups) was charged to a 50-mL, round-bottom flask equipped with a silicon oil bath and magnetic stirrer, and heated up to 80° C. by the preheated oil bath with stirring to give a clear, pale green, viscous solution. To the flask, ESO (2.89 g, containing about 12.7 mmol of oxirane groups) was then added, and the resulting mixture was bubbled with nitrogen for two minutes. Afterwards, heating and stirring (300 rpm) were continued for 40 minutes at the same temperature to give an initial-stage polymer that is a clear, pale green, viscous "syrup". The flask was then taken out of the oil bath, and the initial-stage polymer syrup was quickly blade-coated on the siliconised face of a sheet of partially siliconized release liner with a glass rod at a coating level of about 7 mg/cm$^2$, to give a thin, uniform layer of sticky, fiber-forming and "wet" coating layer. The adhesive layer was then carefully covered (the siliconized face inwardly) with a sheet of fully siliconized release liner, resulting in a "sandwich" which was then pressed with a rubber roller to achieve a good contact between the adhesive composition and the two liners. Subsequently, the "sandwich" was placed in an air-circulating oven maintained at 160° C. The heat caused the cross-linking reaction of the coating composition. The "sandwich" was taken out of the oven after 9 minutes in the oven. The fully siliconized released liner was peeled off without taking away any adhesive composition; a sheet of BOPP film was immediately and carefully covered on the adhesive layer. The new "sandwich" was then pressed with a rubber roller to achieve sufficient wet-out of the adhesive onto the BOPP backing in order to provide adequate adhesion. After the "sandwich" was cooled down, the partially siliconized release liner could be peeled off with the adhesive composition being completely transferred to the BOPP backing. The siliconized release liner can be optionally left for the protection of the adhesive layers on the BOPP backing or be recovered for re-use. The adhesive coating on the BOPP backing was a thin, clear, pale yellowish green, shiny, uniform, "dry" adhesive layer of sufficient cohesion strength. The finished PSA tape thus obtained possessed good initial tack, formed ropy structure upon removal of it from surfaces (e.g. metal, lacquer, glass, human skin) to which they are applied, and exhibited a good adhesive power of about 1.0 lbf/inch on stainless steel (type 302). The 90° peel adhesion test method and conditions are described in Example 1; the sample was cleanly removed in the test, leaving no adhesive residue on the panel. The experimental conditions and 90° peel adhesion test results are shown in Table 1.

Example 4

This example describes the preparation of a PSA composition from ESO (epoxy equivalent weight~229) and dimer acid (hydrogenated; available from Aldrich; average $M_n$~570, dimer acid≥98%, monomer≤1%, trimer acid≤1%) in a molar ratio of 1:1.05 oxirane groups to carboxylic acid groups in the presence of AFC Accelerator AMC-2 (1.00 wt % based on the weight of the reaction mixture), and of PSA tapes (PVC film as backing material) comprising the composition with the aid of two siliconized release liners with different adhesion-repellence properties for the adhesive composition.

AMC-2 (0.067 g) and dimer acid (3.78 g, containing 13.3 mmol of carboxylic acid groups) was charged to a 50-mL, round-bottom flask equipped with a silicon oil bath and magnetic stirrer, and heated up to 80° C. by the preheated oil bath with stirring to give a clear, pale green, viscous solution. To the flask, ESO (2.89 g, containing about 12.7 mmol of oxirane groups) was then added, and the resulting mixture was bubbled with nitrogen for two minutes. Afterwards, heating and stirring (300 rpm) were continued for 87 minutes at the same temperature to give an initial-stage polymer that is a clear, pale green, viscous "syrup". The flask was then taken out of the oil bath, and the initial-stage polymer syrup was quickly blade-coated on the siliconised face of a sheet of partially siliconized release liner with a glass rod at a coating level of about 7 mg/cm², to give a thin, uniform layer of sticky, fiber-forming and "wet" coating layer. The adhesive layer was then carefully covered (the siliconized face inwardly) with a sheet of fully siliconized release liner, resulting in a "sandwich" which was then pressed with a rubber roller to achieve a good contact between the adhesive composition and the two liners. Subsequently, the "sandwich" was placed in an air-circulating oven maintained at 160° C. The heat caused the cross-linking reaction of the coating composition. The "sandwich" was taken out of the oven after 12 minutes in the oven. The fully siliconized released liner was peeled off without taking away any adhesive composition; a sheet of PVC film was immediately and carefully covered on the adhesive layer. The new "sandwich" was then pressed with a rubber roller to achieve sufficient wet-out of the adhesive onto the PVC backing in order to provide adequate adhesion. After the "sandwich" was cooled down, the partially siliconized release liner could be peeled off with the adhesive composition being completely transferred to the PVC backing. The siliconized release liner can be optionally left for the protection of the adhesive layers on the PVC backing or be recovered for re-use. The adhesive coating on the PVC backing was a thin, clear, pale yellowish green, shiny, uniform, "dry" adhesive layer of sufficient cohesion strength. The finished PSA tape thus obtained possessed good initial tack, formed ropy structure upon removal of it from surfaces (e.g. metal, lacquer, glass, human skin) to which they are applied, and exhibited a good adhesive power of about 0.9 lbf/inch on stainless steel (type 302). The 90° peel adhesion test method and conditions are described in Example 1; the sample was cleanly removed in the test, leaving no adhesive residue on the panel. The experimental conditions and 90° peel adhesion test results are shown in Table 1.

Example 5

This example describes the preparation of a PSA composition from ESO (epoxy equivalent weight~229) and dimer acid (hydrogenated; available from Aldrich; average $M_n$~570, dimer acid≥98%, monomer≤1%, trimer acid≤1%) in a molar ratio of 1:0.99 oxirane groups to carboxylic acid groups in the presence of AFC Accelerator AMC-2 (1.90 wt % based on the weight of the reaction mixture), and of PSA tapes comprising the composition with the aid of two siliconized release liners with different adhesion-repellence properties for the adhesive composition.

AMC-2 (0.117 g) and dimer acid (3.36 g, containing 11.8 mmol of carboxylic acid groups) was charged to a 50-mL, round-bottom flask equipped with a silicon oil bath and magnetic stirrer, and heated up to 80° C. by the preheated oil bath with stirring to give a clear, pale green, viscous solution. To the flask, ESO (2.71 g, containing about 11.9 mmol of oxirane groups) was then added, and the resulting mixture was bubbled with nitrogen for two minutes. Afterwards, heating and stirring (500 rpm) were continued for 25 minutes at the same temperature to give an initial-stage polymer that is a clear, pale green, viscous "syrup". The flask was then taken out of the oil bath, and the initial-stage polymer syrup was quickly blade-coated on the siliconised face of a sheet of partially siliconized release liner with a glass rod at a coating level of about 7 mg/cm², to give a thin, uniform layer of sticky, fiber-forming and "wet" coating layer. The adhesive layer was then carefully covered (the siliconized face inwardly) with a sheet of fully siliconized release liner, resulting in a "sandwich" which was then pressed with a rubber roller to achieve a good contact between the adhesive composition and the two liners. Subsequently, the "sandwich" was placed in an air-circulating oven maintained at 170° C. The heat caused the cross-linking reaction of the coating composition. The "sandwich" was taken out of the oven after 3.5 minutes in the oven. The fully siliconized released liner was peeled off without taking away any adhesive composition; a sheet of paper was immediately and carefully covered on the adhesive layer. The new "sandwich" was then pressed with a rubber roller to achieve sufficient wet-out of the adhesive onto the paper backing in order to provide adequate adhesion. After the "sandwich" was cooled down, the partially siliconized release liner could be peeled off with the adhesive composition being completely transferred to the paper backing. The siliconized release liner can be optionally left for the protection of the adhesive layers on the paper backing or be recovered for re-use. The adhesive coating on the paper backing was a thin, clear, pale yellowish green, shiny, uniform, "dry" adhesive layer of sufficient cohesion strength, and was not found to penetrate the paper backing to give an oily appearance of the PSA tape. The finished PSA tape thus obtained possessed good initial tack, formed ropy structure upon removal of it from surfaces (e.g. metal, lacquer, glass, human skin) to which they are applied, and exhibited a good adhesive power of about 1.2 lbf/inch on stainless steel (type 316). The 90° peel adhesion test method and conditions are described in Example 1; the sample was cleanly removed in the test, leaving no adhesive residue on the panel. The experimental conditions and 90° peel adhesion test results are shown in Table 1.

Example 6

This example describes the preparation of a PSA composition from ESO (epoxy equivalent weight~229) and dimer acid (hydrogenated; available from Aldrich; average $M_n$~570, dimer acid≥98%, monomer≤1%, trimer acid≤1%) in a molar ratio of 1:0.93 oxirane groups to carboxylic acid groups in the presence of AFC Accelerator AMC-2 (1.06 wt % based on the weight of the reaction mixture), and of PSA tapes comprising the composition with the aid of two siliconized release liners with different adhesion-repellence properties for the adhesive composition. AMC-2 (0.092 g), dimer acid (4.67 g, containing 16.4 mmol of carboxylic acid groups) and ESO (4.02 g, containing about 17.6 mmol of oxirane groups) was charged to a 50-mL, round-bottom flask equipped with a silicon oil bath and magnetic stirrer. The resulting mixture was bubbled with nitrogen for two minutes, and then sealed and heated up to 80° C. by the preheated oil bath with stirring. Heating and stirring (500 rpm) were continued for 50 minutes at this temperature to give an initial-stage polymer that is a clear, pale green, viscous solution. The flask was then taken out of the oil bath, and the initial-stage polymer syrup was quickly blade-coated on the siliconised face of a sheet of partially siliconized release liner with a glass rod at a coating level of about 7 mg/cm$^2$, to give a thin, uniform layer of sticky, fiber-forming and "wet" coating layer. The adhesive layer was then carefully covered (the siliconized face inwardly) with a sheet of fully siliconized release liner, resulting in a "sandwich" which was then pressed with a rubber roller to achieve a good contact between the adhesive composition and the two liners. Subsequently, the "sandwich" was placed in an air-circulating oven maintained at 160° C. The heat caused the cross-linking reaction of the coating composition. The "sandwich" was taken out of the oven after 8 minutes in the oven. The fully siliconized released liner was peeled off without taking away any adhesive composition; a sheet of paper was immediately and carefully covered on the adhesive layer. The new "sandwich" was then pressed with a rubber roller to achieve sufficient wet-out of the adhesive onto the paper backing in order to provide adequate adhesion. After the "sandwich" was cooled down, the partially siliconized release liner could be peeled off with the adhesive composition being completely transferred to the paper backing. The siliconized release liner can be optionally left for the protection of the adhesive layers on the paper backing or be recovered for re-use. The adhesive coating on the paper backing was a thin, clear, pale yellowish-green, shiny, uniform, "dry" adhesive layer of sufficient cohesion strength, and was not found to penetrate the paper backing to give an oily appearance of the PSA tape. The finished PSA tape thus obtained possessed good initial tack, formed ropy structure upon removal of it from surfaces (e.g. metal, lacquer, glass, human skin) to which they are applied, and exhibited a good adhesive power of about 1.3 lbf/inch on stainless steel (type 316). The 90° peel adhesion test method and conditions are described in Example 1; the sample was cleanly removed in the test, leaving no adhesive residue on the panel. The experimental conditions and 90° peel adhesion test results are shown in Table 1.

Example 7

This example describes the preparation of a PSA composition from ESO (epoxy equivalent weight~229), dimer acid (hydrogenated; available from Aldrich; average $M_n$~570, dimer acid≥98%, monomer≤1%, trimer acid≤1%), and bisphenol A diglycidyl ether (BPAGE, EEW=172-174) (molar ratio of total oxirane groups to carboxylic acid group is about 1:1.11) in the presence of AMC-2, and of PSA tapes comprising the composition with the aid of two siliconized release liners with different adhesion-repellence properties for the adhesive composition.

AMC-2 (0.064 g) and dimer acid (4.17 g, containing 14.6 mmol of carboxylic acid groups) was charged to a 50-mL, round-bottom flask equipped with a silicon oil bath and magnetic stirrer, and heated up to 80° C. by the preheated oil bath with stirring to give a clear, pale green, viscous solution. To the flask, BPAGE (0.94 g, containing about 5.4 mmol of oxirane groups) was then added, and the resulting mixture was bubbled with nitrogen for two minutes. Afterwards, heating and stirring (500 rpm) were continued for 120 minutes at the same temperature to give a $1^{st}$ stage prepolymer that is a clear, pale green "syrup" of high viscosity (at room temperature). To the mixture, ESO (1.76 g, containing about 7.7 mmol of oxirane groups) was added, and heating and stirring (500 rpm) were continued for another 15 minutes at the same temperature to give a $2^{nd}$-stage prepolymer that is a clear, pale green "syrup" of high viscosity (at room temperature). The flask was then taken out of the oil bath, and the $2^{nd}$-stage prepolymer syrup was quickly blade-coated on the siliconised face of a sheet of partially siliconized release liner with a glass rod at a coating level of about 7 mg/cm$^2$, to give a thin, uniform layer of sticky, fiber-forming and "wet" coating layer. The adhesive layer was then carefully covered (the siliconized face inwardly) with a sheet of fully siliconized release liner, resulting in a "sandwich" which was then pressed with a rubber roller to achieve a good contact between the adhesive composition and the two liners. Subsequently, the "sandwich" was placed in an air-circulating oven maintained at 160° C. The heat caused the cross-linking reaction of the coating composition. The "sandwich" was taken out of the oven after 5 minutes in the oven. The fully siliconized released liner was peeled off without taking away any adhesive composition; a sheet of paper was immediately and carefully covered on the adhesive layer. The new "sandwich" was then pressed with a rubber roller to achieve sufficient wet-out of the adhesive onto the paper backing in order to provide adequate adhesion. After the "sandwich" was cooled down, the partially siliconized release liner could be peeled off with the adhesive composition being completely transferred to the paper backing. The siliconized release liner can be optionally left for the protection of the adhesive layers on the paper backing or be recovered for re-use. The adhesive coating on the paper backing was a thin, clear, pale yellowish green, shiny, uniform, "dry" adhesive layer of sufficient cohesion strength, and was not found to penetrate the paper backing to give an oily appearance of the PSA tape. The finished PSA tape thus obtained possessed good initial tack, formed ropy structure upon removal of it from surfaces (e.g. metal, lacquer, glass, human skin) to which they are applied, and exhibited a very good adhesive power of about 3.2 lbf/inch on stainless steel (type 316). The 90° peel adhesion test method and conditions are described in Example 1; the sample was cleanly removed in the test, leaving no adhesive residue on the panel. The experimental conditions and 90° peel adhesion test results are shown in Table 1.

Example 8

This example describes the preparation of a PSA composition from ESO (epoxy equivalent weight~229), dimer acid (hydrogenated; available from Aldrich; average $M_n$~570, dimer acid≥98%, monomer≤1%, trimer acid≤1%), and BPAGE (EEW=172-174) (molar ratio of total oxirane groups to carboxylic acid group is about 1:1.07) in the presence of AMC-2, and of PSA tapes (BOPP film as backing material) comprising the composition with the aid of two siliconized release liners with different adhesion-repellence properties for the adhesive composition.

AMC-2 (0.065 g) and dimer acid (4.17 g, containing 14.6 mmol of carboxylic acid groups) was charged to a 50-mL, round-bottom flask equipped with a silicon oil bath and magnetic stirrer, and heated up to 150° C. by the preheated oil bath with stirring to give a clear, pale green, viscous solution. To the flask, BPAGE (0.97 g, containing about 5.60 mmol of oxirane groups) was then added, and the resulting mixture was bubbled with nitrogen for two minutes. Afterwards, heating and stirring (300 rpm) were continued for 80 minutes at the same temperature to give a $1^{st}$ stage prepolymer that is a clear, pale green "syrup" of high viscosity (at room temperature). The mixture was then cooled to 80° C., followed by addition of ESO (1.84 g, containing about 8.06 mmol of oxirane groups) to the mixture, and heating and stirring (300 rpm) were continued for another 43 minutes at the same temperature to give a $2^{nd}$-stage prepolymer that is a clear, pale green "syrup" of high viscosity (at room temperature). The flask was then taken out of the oil bath, and the $2^{nd}$-stage prepolymer syrup was quickly blade-coated on the siliconised face of a sheet of partially siliconized release liner with a glass rod at a coating level of about 7 mg/cm$^2$, to give a thin, uniform layer of sticky, fiber-forming and "wet" coating layer. The adhesive layer was then carefully covered (the siliconized face inwardly) with a sheet of fully siliconized release liner, resulting in a "sandwich" which was then pressed with a rubber roller to achieve a good contact between the adhesive composition and the two liners. Subsequently, the "sandwich" was placed in an air-circulating oven maintained at 160° C. The heat caused the cross-linking reaction of the coating composition. The "sandwich" was taken out of the oven after 13 minutes in the oven. The fully siliconized released liner was peeled off without taking away any adhesive composition; a sheet of BOPP film was immediately and carefully covered on the adhesive layer. The new "sandwich" was then pressed with a rubber roller to achieve sufficient wet-out of the adhesive onto the BOPP backing in order to provide adequate adhesion. After the "sandwich" was cooled down, the partially siliconized release liner could be peeled off with the adhesive composition being completely transferred to the BOPP backing. The siliconized release liner can be optionally left for the protection of the adhesive layers on the BOPP backing or be recovered for re-use. The adhesive coating on the BOPP backing was a thin, clear, pale yellowish green, shiny, uniform, "dry" adhesive layer of sufficient cohesion strength. The finished PSA tape thus obtained possessed good initial tack, formed ropy structure upon removal of it from surfaces (e.g. metal, lacquer, glass, human skin) to which they are applied, and exhibited a good adhesive power of about 1.8 lbf/inch on stainless steel (type 302). The 90° peel adhesion test method and conditions are described in Example 1; the sample was cleanly removed in the test, leaving no adhesive residue on the panel. The experimental conditions and 90° peel adhesion test results are shown in Table 1.

The shear time to failure for the above sample was determined to be longer than 25 days according to the Standard Test Method for Shear Adhesion of PSA tapes; the mode of failure is adhesion failure, i.e., the sample was cleanly removed in the test, leaving no adhesive residue on the panel. The internal or cohesive strength of an adhesive film is known as shear. This is a measure of the internal strength of the adhesive itself. Shear properties are typically quantified using the static shear test method. The following procedure describes Standard Test for Shear Adhesion of Pressure-Sensitive Tapes in accordance with Procedure A of ASTM D3654/D3654M-06 (2006). The tests are performed at 23±1° C. and 50±5% RH on a stainless steel substrate (type 302, with bright annealed finish, 2 by 5 inches), using a 1000 gram test mass and 1 inch times 1 inch testing area. An exemplary shear adhesion test of sample tapes consists of following steps:

(1) Clean the test panel three times with acetone and Kimwipe-Clark wipers, and condition the panel for about 10-12 minutes before applying the tape onto the panel.
(2) Randomly cut 3 strips of specimens from each PSA-coated sample sheet. The size of the specimens is 1 inch in width.
(3) Center the test specimen at one end of the test panel and apply, without added pressure, to cover an area exactly 1 by 1 inch, with tape.
(4) Place hook on the free end of the tape specimen, ensuring that the hook extends completely across the width of the specimen and is aligned to uniformly distribute the load.
(5) Place the test assembly in the test stand so that the free end of the test specimen is vertical, ensuring that no peel forces act on the specimen.
(6) Individually prepare each specimen and test within one minute. To start the test, apply the 1000 g mass to the hook gently so as to cause no shear impact force on the tape specimen.
(7) Record the time elapse in which the tape specimen has separated completely from the test panel, and the mode of failure (cohesive failure or adhesion failure).
(8) Repeat the above steps to test the other two strips of specimen, and average the results.

Example 9

This example describes the preparation of a PSA composition from ESO (epoxy equivalent weight~229), dimer acid (hydrogenated; available from Aldrich; average $M_n$~570, dimer acid≥98%, monomer≤1%, trimer acid≤1%), and BPAGE (EEW=172-174) (molar ratio of total oxirane groups to carboxylic acid group is about 1:1.07) in the presence of AMC-2, and of PSA tapes (PVC film as backing material) comprising the composition with the aid of two siliconized release liners with different adhesion-repellence properties for the adhesive composition.

AMC-2 (0.065 g) and dimer acid (4.17 g, containing 14.6 mmol of carboxylic acid groups) was charged to a 50-mL, round-bottom flask equipped with a silicon oil bath and magnetic stirrer, and heated up to 150° C. by the preheated oil bath with stirring to give a clear, pale green, viscous solution. To the flask, BPAGE (0.97 g, containing about 5.60 mmol of oxirane groups) was then added, and the resulting mixture was bubbled with nitrogen for two minutes. Afterwards, heating and stirring (300 rpm) were continued for 80 minutes at the same temperature to give a $1^{st}$ stage prepolymer that is a clear, pale green "syrup" of high viscosity (at room temperature). The mixture was then cooled to 80° C., followed by addition of ESO (1.84 g, containing about 8.06 mmol of oxirane groups) to the mixture, and heating and stirring (300 rpm) were continued for another 15 minutes at the same temperature to give a $2^{nd}$-stage prepolymer that is a clear, pale green "syrup" of high viscosity (at room temperature). The flask was then taken out of the oil bath, and the $2^{nd}$-stage prepolymer syrup was quickly blade-coated on the siliconised face of a sheet of partially siliconized release liner with a glass rod at a coating level of about 7 mg/cm$^2$, to give a thin, uniform layer of sticky, fiber-forming and "wet" coating layer. The adhesive layer was then carefully covered (the siliconized face inwardly) with a sheet of fully siliconized release liner, resulting in a "sandwich" which was then pressed with a rubber roller to achieve a good contact between the adhesive composition and the two liners. Subsequently, the "sandwich" was placed in an air-circulating oven maintained at 160° C. The heat caused the cross-linking reaction of the coating composition. The "sandwich" was taken out of the oven after 12 minutes in the oven. The fully siliconized released liner was peeled off without taking away any adhesive composition; a sheet of PVC film was immediately and carefully covered on the adhesive layer. The new "sandwich" was then pressed with a rubber roller to achieve sufficient wet-out of the adhesive onto the PVC backing in order to provide adequate adhesion. After the "sandwich" was cooled down, the partially siliconized release liner could be peeled off with the adhesive composition being completely transferred to the PVC backing. The siliconized release liner can be optionally left for the protection of the adhesive layers on the PVC backing or be recovered for re-use. The adhesive coating on the PVC backing was a thin, clear, pale yellowish green, shiny, uniform, "dry" adhesive layer of sufficient cohesion strength. The finished PSA tape thus obtained possessed good initial tack, formed ropy structure upon removal of it from surfaces (e.g. metal, lacquer, glass, human skin) to which they are applied, and exhibited a good adhesive power of about 2.0 lbf/inch on stainless steel (type 302). The 90° peel adhesion test method and conditions are described in Example 1; the sample was cleanly removed in the test, leaving no adhesive residue on the panel. The experimental conditions and 90° peel adhesion test results are shown in Table 1.

Example 10

This example describes the preparation of a PSA composition from ESO (epoxy equivalent weight~229), sebacic acid (98% purity), and BPAGE (EEW=172-174) (molar ratio of total oxirane groups to carboxylic acid group is about 1:1.12) in the presence of AMC-2, and of PSA tapes comprising the composition with the aid of two siliconized release liners with different adhesion-repellence properties for the adhesive composition.

AMC-2 (0.070 g) and BPAGE (1.580 g, containing about 9.08 mmol of oxirane groups) were charged to a 50-mL, round-bottom flask equipped with a silicon oil bath and magnetic stirrer, and heated up to 150° C. by the preheated oil bath with stirring to give a clear, pale green, viscous solution. Sebacic acid (2.518 g, containing 24.4 mmol of carboxylic acid groups) was added to the flask, and then the resulting mixture was bubbled with nitrogen for two minutes. Afterwards, heating and stirring (500 rpm) were continued for 60 minutes at the same temperature (150° C.) to give a $1^{st}$ stage prepolymer that is a clear, pale green "syrup" (a little hazy). To the mixture, ESO (2.912 g, containing about 12.7 mmol of oxirane groups) was added, and heating and stirring (500 rpm) were continued for another 3 minutes at the same temperature to give a $2^{nd}$ stage prepolymer that is a clear, pale green "syrup" of high viscosity. The flask was then taken out of the oil bath, and the $2^{nd}$ stage prepolymer syrup was quickly blade-coated on the siliconised face of a sheet of partially siliconized release liner with a glass rod at a coating level of about 7 mg/cm$^2$, to give a thin, uniform layer of sticky, fiber-forming and "wet" coating layer. The adhesive layer was then carefully covered (the siliconized face inwardly) with a sheet of fully siliconized release liner, resulting in a "sandwich" which was then pressed with a rubber roller to achieve a good contact between the adhesive composition and the two liners. Subsequently, the "sandwich" was placed in an air-circulating oven maintained at 160° C. The heat caused the cross-linking reaction of the coating composition. The "sandwich" was taken out of the oven after 5 minutes in the oven. The fully siliconized released liner was peeled off without taking away any adhesive composition; a sheet of paper was immediately and carefully covered on the adhesive layer. The new "sandwich" was then pressed with a rubber roller to achieve sufficient wet-out of the adhesive onto the paper backing in order to provide adequate adhesion. After the "sandwich" was cooled down, the partially siliconized release liner could be peeled off with the adhesive composition being completely transferred to the paper backing. The siliconized release liner can be optionally left for the protection of the adhesive layers on the paper backing or be recovered for re-use. The adhesive coating on the paper backing was a thin, clear, pale yellowish green, shiny, uniform, "dry" adhesive layer of sufficient cohesion strength, and was not found to penetrate the paper backing to give an oily appearance of the PSA tape. The finished PSA tape thus obtained possessed good initial tack, formed ropy structure upon removal of it from surfaces (e.g. metal, lacquer, glass, human skin) to which they are applied, and exhibited a good adhesive power of about 2.1 lbf/inch on stainless steel (type 316). The 90° peel adhesion test method and conditions are described in Example 1; the sample was cleanly removed in the test, leaving no adhesive residue on the panel. The experimental conditions and 90° peel adhesion test results are shown in Table 1.

In view of the many possible embodiments to which the principles of the disclosed compositions, articles of manufacture, and methods may be applied, it should be recognized that the illustrated embodiments are only preferred examples.

What is claimed is:

1. A pressure sensitive adhesive construct comprising:
   (A) a backing substrate; and
   (B) a pressure sensitive adhesive composition disposed on the backing substrate, wherein the pressure sensitive adhesive composition includes a product made from
      (i) at least one epoxidized vegetable oil and;
      (ii) a prepolymer or oligomer capped with a carboxylic acid group at both prepolymer or oligomer chain ends, or a branched prepolymer or oligomer with at least two of the prepolymer or oligomer branches and chain ends capped with a carboxylic acid group, wherein the carboxylic acid-capped prepolymer or carboxylic acid-capped oligomer is made from (a) an excess of dibasic acid reacted with (b) a glycidyl or an epoxidized compound having at least two epoxy groups, or a combination thereof.

2. The construct of claim 1, wherein the epoxidized vegetable oil is epoxidized soybean oil.

3. The construct of claim 1, wherein the pressure sensitive adhesive composition includes at least about 50 weight percent of the product, based on the total weight of the pressure sensitive adhesive composition.

4. The construct of claim 1, wherein the pressure sensitive adhesive is disposed on the backing substrate at a coating level of 2 to 10 mg/cm$^2$.

5. The construct of claim 1, wherein the dibasic acid comprises a dimer acid.

6. The construct of claim 5, wherein the dimer acid is a dimer of linoleic acid, oleic acid, or a mixture thereof.

7. The construct of claim 5, wherein the dimer acid is a dimer of an unsaturated fatty acid.

8. The construct of claim 1, wherein the dibasic acid comprises sebacic acid.

9. The construct of claim 1, wherein the dibasic acid is reacted with a diglycidyl ether.

10. The construct of claim 1, wherein the pressure sensitive adhesive composition comprises a polymer that is a reaction product of (i) and (ii).

11. The construct of claim 1, wherein the glycidyl or the epoxidized compound having at least two epoxy groups is selected from bisphenol A diglycidyl ether, bisphenol F diglycidyl ether, bisphenol A propoxylate diglycidyl ether, bisphenol A ethoxylate diglycidyl ether, diethylene glycol diglycidyl ether, 1,3-butanediol diglycidyl ether, 1,4-butanediol diglycidyl ether, poly(ethylene glycol) diglycidyl ether, poly(propylene glycol) diglycidyl ether, neopentyl glycol diglycidyl ether, glycerol diglycidyl ether, diglycidyl 1,2,3,6-tetrahydrophthalate, 1,2-cyclohexanedicarboxylate diglycidyl ether, 1,4-cyclohexanedimethanol diglycidyl ether, resorcinol diglycidyl ether, poly(dimethylsiloxane) terminated with diglycidyl ether, epoxidized linoleic acid ester, epoxidized vegetable oils with two epoxy functional groups, trimethylolpropane triglycidyl ether, trimethylolethane triglycidyl ether, N,N-Diglycidyl-4-glycidyloxyaniline, tris(4-hydroxyphenyl)methane triglycidyl ether, or tris(2,3-epoxypropyl) isocyanurate.

12. The construct of claim 1, wherein the prepolymer or oligomer includes repeating units having a structure of:

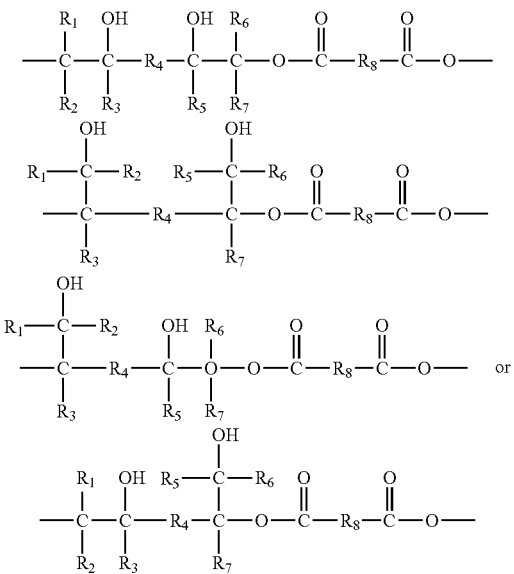

wherein each of $R_1$, $R_2$, $R_3$, $R_4$, $R_5$, $R_6$, $R_7$, and $R_8$ independently represents hydrogen or a substituted or unsubstituted alkyl or heteroalkyl group.

13. The construct of claim 1, wherein (B)(ii)(b) is a glycidyl.

14. A pressure sensitive adhesive construct comprising:
(I) a backing substrate; and
(II) a pressure sensitive adhesive composition disposed on the backing substrate, wherein the pressure sensitive adhesive composition comprises a a reaction product made by reacting
  (A) an epoxidized vegetable oil with;
  (B) a component selected from:
    (i) a dimer acid or anhydride thereof, a trimer acid or anhydride thereof, or a mixture thereof;
    (ii) a prepolymer or oligomer capped with a carboxylic acid group at both prepolymer or oligomer chain ends, or a branched prepolymer or oligomer with at least two of the prepolymer or oligomer branches and chain ends capped with a carboxylic acid group, wherein the carboxylic acid-capped prepolymer or oligomer is made from a (a) an excess of a dibasic acid reacted with (b) a glycidyl or an epoxidized compound having at least two epoxy groups, or a combination thereof; or
    (iii) a combination of (i) and (ii).

15. The construct of claim 14, wherein component (B)(i) comprises a dimer acid.

16. The construct of claim 15, wherein the dimer acid is a dimer of linoleic acid, oleic acid, or a mixture thereof.

17. The construct of claim 15, wherein the dimer acid is a dimer of an unsaturated fatty acid.

18. The construct of claim 14, wherein the epoxidized vegetable oil is epoxidized soybean oil.

19. The construct of claim 14 wherein component (B) is a dimer acid.

20. The construct of claim 19, wherein the dimer acid is a dimer of an unsaturated fatty acid.

21. The construct of claim 14, wherein the glycidyl or the epoxidized compound having at least two epoxy groups is selected from bisphenol A diglycidyl ether, bisphenol F diglycidyl ether, bisphenol A propoxylate diglycidyl ether, bisphenol A ethoxylate diglycidyl ether, diethylene glycol diglycidyl ether, 1,3-butanediol diglycidyl ether, 1,4-butanediol diglycidyl ether, poly(ethylene glycol) diglycidyl ether, poly(propylene glycol) diglycidyl ether, neopentyl glycol diglycidyl ether, glycerol diglycidyl ether, diglycidyl 1,2,3,6-tetrahydrophthalate, 1,2-cyclohexanedicarboxylate diglycidyl ether, 1,4-cyclohexanedimethanol diglycidyl ether, resorcinol diglycidyl ether, poly(dimethylsiloxane) terminated with diglycidyl ether, epoxidized linoleic acid ester, epoxidized vegetable oils with two epoxy functional groups, trimethylolpropane triglycidyl ether, trimethylolethane triglycidyl ether, N,N-Diglycidyl-4-glycidyloxyaniline, tris(4-hydroxyphenyl)methane triglycidyl ether, or tris(2,3-epoxypropyl) isocyanurate.

22. The construct of claim 14, wherein the prepolymer or oligomer includes repeating units having a structure of:

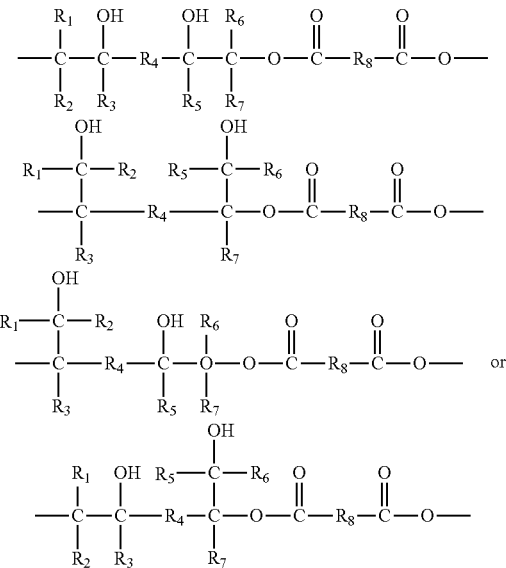

wherein each of $R_1$, $R_2$, $R_3$, $R_4$, $R_5$, $R_6$, $R_7$, and $R_8$ independently represents hydrogen or a substituted or unsubstituted alkyl or heteroalkyl group.

23. The construct of claim 14, wherein (B)(ii)(b) is a glycidyl.

24. A method for making a pressure sensitive adhesive construct comprising:
reacting (i) at least one epoxidized vegetable oil with (ii) a prepolymer or oligomer capped with a carboxylic acid group at both prepolymer or oligomer chain ends, or a branched prepolymer or oligomer with at least two of the prepolymer or oligomer branches and chain ends capped with a carboxylic acid group, wherein the carboxylic acid-capped prepolymer or carboxylic acid-capped oligomer is made from (a) an excess of dibasic acid reacted with (b) a glycidyl or an epoxidized compound having at least two epoxy groups, or a combination thereof; and
forming on a backing substrate a pressure sensitive adhesive from the resulting reaction product.

25. The method of claim 24, wherein the method comprises:
initially reacting the epoxidized vegetable oil with component (ii) to produce a second prepolymer product;
applying the second prepolymer product onto a backing substrate or a release liner; and
further reacting the second prepolymer product to produce the pressure sensitive adhesive composition.

26. The method of claim 25, wherein initially reacting the epoxidized vegetable oil with component (ii) comprises heating a mixture of the epoxidized vegetable oil and component (ii) at a temperature of 30 to 300° C.

27. The method of claim 25, wherein the further reacting of the second prepolymer product comprises heating the prepolymer product disposed on the backing substrate at a temperature of 100 to 300° C.

28. The method of claim 25, wherein:
the second prepolymer product is applied onto a release liner or a backing substrate;
a backing substrate is placed onto a surface of the prepolymer coating opposing the release liner, or a release liner is placed on a surface of the prepolymer coating opposing the backing substrate, to form a release liner/second prepolymer product/backing substrate assembly;
pressure is applied to the resulting assembly; and
at least the second prepolymer product on the backing substrate or release liner is heated to produce the pressure sensitive adhesive composition.

29. The method of claim 24, wherein the epoxidized vegetable oil is initially reacted with at least one monobasic acid or anhydride resulting in a modified epoxidized vegetable oil; and the modified epoxidized vegetable oil is reacted with component (ii).

30. The method of claim 29, wherein the amount of monobasic acid or anhydride reacted with the epoxidized vegetable oil is sufficient to leave 1.5 to 6 of epoxy groups per one mole of the modified epoxidized vegetable oil.

31. The method of claim 24, wherein the amount of component (ii) reacted with the epoxidized vegetable oil is in a molar ratio of component (ii) carboxylic acid groups to epoxidized vegetable oil epoxy groups of from 3:1 to 1:3.

32. The method of claim 24, further comprising reacting the epoxidized vegetable oil with a monobasic acid or anhydride thereof to produce a modified epoxidized vegetable oil that is reacted with component (ii).

33. The method of claim 24, wherein the dibasic acid comprises a dimer acid.

34. The method of claim 33, wherein the dimer acid is a dimer of an unsaturated fatty acid.

35. The method of claim 24, wherein the dibasic acid comprises sebacic acid.

36. A method for making a pressure sensitive adhesive composition comprising:
(a) reacting (i) a dibasic acid with (ii) at least one agent to provide a prepolymer or oligomer capped with a carboxylic acid group at both prepolymer or oligomer chain ends, or a branched prepolymer or oligomer with at least two of the prepolymer or oligomer branches and prepolymer or oligomer chain ends capped with a carboxylic acid group, wherein the at least one agent comprises a diglycidyl ether, an epoxidized compound having at least two epoxy groups, or a combination thereof; and
(b) reacting at least one epoxidized vegetable oil with the carboxylic acid-capped prepolymer or carboxylic acid-capped oligomer to produce a pressure sensitive adhesive composition.

37. The method of claim 36, wherein the dibasic agent comprises a dimer acid, and the at least one agent comprises a diglycidyl ether.

38. The method of claim 36, wherein the dibasic agent comprises sebacic acid, and the at least one agent comprises a diglycidyl ether.

39. The method of claim 36, wherein the amount of carboxylic acid-capped prepolymer or carboxylic acid-capped oligomer reacted with the epoxidized vegetable oil is in a molar ratio of carboxyl groups to epoxy groups of 3:1 to 1:3.

40. The method of claim 36, wherein the dibasic acid is a dimer of an unsaturated fatty acid.

* * * * *